(12) United States Patent
Helmick et al.

(10) Patent No.: US 12,645,396 B2
(45) Date of Patent: Jun. 2, 2026

(54) SYSTEMS, METHODS, AND APPARATUS FOR DATA PLACEMENT IN A STORAGE DEVICE

(71) Applicant: Samsung Electronics Co., Ltd., Suwon-si (KR)

(72) Inventors: Daniel Lee Helmick, Broomfield, CO (US); Michael Allison, Denver, CO (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/099,246

(22) Filed: Jan. 19, 2023

(65) Prior Publication Data

US 2024/0012579 A1     Jan. 11, 2024

Related U.S. Application Data

(60) Provisional application No. 63/421,994, filed on Nov. 2, 2022, provisional application No. 63/419,699, filed
(Continued)

(51) Int. Cl.
G06F 3/06          (2006.01)
(52) U.S. Cl.
CPC .......... G06F 3/0659 (2013.01); G06F 3/0619 (2013.01); G06F 3/0679 (2013.01)
(58) Field of Classification Search
CPC .... G06F 3/0659; G06F 3/0619; G06F 3/0679; G06F 2212/1024; G06F 2212/1036;
(Continued)

(56) References Cited

U.S. PATENT DOCUMENTS 7,184,917 B2    2/2007  Pramanick et al.
7,376,807 B2 *  5/2008  Moyer ................ G06F 12/1027
                                                        711/138
(Continued)

FOREIGN PATENT DOCUMENTS

CN          109783011 A    5/2019
CN          110018966 A    7/2019
(Continued)

OTHER PUBLICATIONS

Sam Ingalls, "Queue", Jul. 2, 2021, pp. 1-6, https://www.webopedia.com/definitions/queue/ (Year: 2021).*
(Continued)

*Primary Examiner* — Christopher D Birkhimer
(74) *Attorney, Agent, or Firm* — Renaissance IP Law Group LLP

(57)          ABSTRACT

An apparatus may include a storage device that may include at least one storage medium and a controller configured to control the at least one storage medium, wherein the controller may be configured to: receive a write command, wherein the write command may indicate a reclaim unit handle; perform, based on the reclaim unit handle, and based on an operation or condition of the storage device, a selection of a reclaim unit of the at least one storage medium; and store, based on the write command, data to the reclaim unit. The storage medium may include a first reclaim group including the first reclaim unit and a second reclaim group including a second reclaim unit of the at least one storage medium, and the selection of the first reclaim unit may include performing a selection of the first reclaim group.

20 Claims, 22 Drawing Sheets

Related U.S. Application Data on Oct. 26, 2022, provisional application No. 63/358,861, filed on Jul. 6, 2022.

(58) Field of Classification Search
CPC ..... G06F 2212/7201; G06F 2212/7203; G06F 2212/7204; G06F 2212/7205; G06F 2212/7208; G06F 3/0616; G06F 3/064; G06F 3/0652; G06F 3/0656; G06F 12/0246
See application file for complete search history.

(56) References Cited

U.S. PATENT DOCUMENTS

| | | | | |
|---|---|---|---|---|
| 7,610,437 | B2 * | 10/2009 | Sinclair | G06F 3/0652 |
| | | | | 711/104 |
| 7,716,180 | B2 | 5/2010 | Vermeulen et al. | |
| 7,984,084 | B2 * | 7/2011 | Sinclair | G06F 16/1847 |
| | | | | 707/818 |
| 8,285,918 | B2 * | 10/2012 | Maheshwari | G11C 7/1072 |
| | | | | 711/159 |
| 8,296,398 | B2 | 10/2012 | Lacapra et al. | |
| 8,370,611 | B2 * | 2/2013 | Choi | G11C 7/1045 |
| | | | | 710/13 |
| 8,443,263 | B2 * | 5/2013 | Selinger | G06F 11/1068 |
| | | | | 714/768 |
| 8,873,284 | B2 * | 10/2014 | Sinclair | G06F 12/0246 |
| | | | | 365/185.11 |
| 9,223,693 | B2 * | 12/2015 | Sinclair | G06F 12/0246 |
| 9,336,133 | B2 * | 5/2016 | Sinclair | G06F 12/0246 |
| 9,348,746 | B2 * | 5/2016 | Sinclair | G06F 12/0246 |
| 9,465,731 | B2 * | 10/2016 | Sinclair | G06F 12/0246 |
| 9,652,382 | B1 * | 5/2017 | Subramanian | G06F 12/0253 |
| 9,684,463 | B1 | 6/2017 | Alshinnawi et al. | |
| 9,734,050 | B2 * | 8/2017 | Sinclair | G06F 12/0253 |
| 9,734,911 | B2 * | 8/2017 | Sinclair | G06F 3/0658 |
| 9,778,855 | B2 * | 10/2017 | Sinclair | G06F 3/064 |
| 9,892,803 | B2 * | 2/2018 | Reed | G06F 12/0811 |
| 9,996,473 | B2 | 6/2018 | Tomlin et al. | |
| 10,108,543 | B1 * | 10/2018 | Duggal | G06F 11/14 |
| 10,108,544 | B1 * | 10/2018 | Duggal | G06F 11/14 |
| 10,120,613 | B2 * | 11/2018 | Sinclair | G06F 12/02 |
| 10,133,490 | B2 * | 11/2018 | Sinclair | G06F 3/0655 |
| 10,176,212 | B1 | 1/2019 | Prohofsky | |
| 10,255,179 | B2 * | 4/2019 | Ji | G06F 3/0659 |
| 10,365,827 | B1 * | 7/2019 | Satish | G06F 12/1072 |
| 10,430,279 | B1 * | 10/2019 | Dittia | G06F 3/0656 |
| 10,579,286 | B2 | 3/2020 | Oh et al. | |
| 10,739,996 | B1 * | 8/2020 | Ebsen | G06F 16/1727 |
| 10,795,812 | B1 * | 10/2020 | Duggal | G06F 3/067 |
| 10,884,920 | B2 | 1/2021 | Benisty et al. | |
| 10,891,228 | B2 * | 1/2021 | Steinmacher-Burow | |
| | | | | G06F 12/0817 |
| 10,903,981 | B1 | 1/2021 | Tian | |
| 10,942,852 | B1 | 3/2021 | Tian | |
| 10,983,715 | B2 * | 4/2021 | Sharoni | G06F 21/79 |
| 11,086,537 | B2 * | 8/2021 | Byun | G06F 3/0604 |
| 11,200,005 | B2 | 12/2021 | Patel et al. | |
| 11,347,409 | B1 | 5/2022 | Randolph et al. | |
| 2005/0144358 | A1 | 6/2005 | Conley et al. | |
| 2007/0033325 | A1 * | 2/2007 | Sinclair | G06F 3/0608 |
| | | | | 711/170 |
| 2007/0198804 | A1 * | 8/2007 | Moyer | G06F 12/1027 |
| | | | | 711/202 |
| 2008/0082596 | A1 * | 4/2008 | Gorobets | G06F 12/0253 |
| 2008/0189477 | A1 * | 8/2008 | Asano | G06F 12/0246 |
| | | | | 711/E12.008 |
| 2009/0313453 | A1 * | 12/2009 | Stefanus | G06F 11/1441 |
| | | | | 711/E12.001 |
| 2011/0137870 | A1 * | 6/2011 | Feder | H04L 67/1001 |
| | | | | 707/662 |
| 2011/0145473 | A1 * | 6/2011 | Maheshwari | G11C 7/1072 |
| | | | | 711/E12.008 |
| 2011/0161784 | A1 * | 6/2011 | Selinger | G06F 11/1016 |
| | | | | 714/E11.002 |
| 2014/0006688 | A1 * | 1/2014 | Yu | G06F 12/0246 |
| | | | | 365/185.03 |
| 2014/0325148 | A1 * | 10/2014 | Choi | G06F 3/0659 |
| | | | | 711/114 |
| 2014/0365719 | A1 * | 12/2014 | Kuzmin | G06F 12/0246 |
| | | | | 711/103 |
| 2015/0227602 | A1 * | 8/2015 | Ramu | G06F 11/1456 |
| | | | | 707/634 |
| 2016/0246713 | A1 * | 8/2016 | Choi | G06F 3/0608 |
| 2017/0123655 | A1 * | 5/2017 | Sinclair | G06F 3/061 |
| 2017/0192902 | A1 * | 7/2017 | Hwang | G06F 3/0661 |
| 2017/0242790 | A1 * | 8/2017 | O'Krafka | G06F 3/0652 |
| 2017/0300422 | A1 * | 10/2017 | Szubbocsev | G06F 12/1009 |
| 2018/0189175 | A1 * | 7/2018 | Ji | G06F 3/0679 |
| 2018/0196743 | A1 | 7/2018 | McVay et al. | |
| 2019/0243758 | A1 | 8/2019 | Takeda et al. | |
| 2020/0045110 | A1 * | 2/2020 | Varnica | G06F 16/483 |
| 2020/0089420 | A1 * | 3/2020 | Sharoni | G06F 21/79 |
| 2020/0174671 | A1 | 6/2020 | Margaglia et al. | |
| 2020/0192794 | A1 * | 6/2020 | Lee | G06F 12/0246 |
| 2020/0218653 | A1 * | 7/2020 | Ryu | G06F 12/0253 |
| 2020/0233612 | A1 * | 7/2020 | Dalmatov | G06F 3/0631 |
| 2020/0293225 | A1 * | 9/2020 | Hsieh | G06F 12/0246 |
| 2020/0310686 | A1 * | 10/2020 | Truong | G06F 3/061 |
| 2021/0096772 | A1 | 4/2021 | Lee | |
| 2021/0216233 | A1 | 7/2021 | Bolen et al. | |
| 2021/0303511 | A1 | 9/2021 | Karr | |
| 2021/0303522 | A1 | 9/2021 | Periyagaram et al. | |
| 2021/0342362 | A1 * | 11/2021 | Haravu | G06F 11/1464 |
| 2021/0406216 | A1 * | 12/2021 | Komatsu | G06F 16/128 |
| 2022/0091743 | A1 | 3/2022 | Chang et al. | |
| 2022/0129378 | A1 | 4/2022 | McJilton et al. | |
| 2022/0147392 | A1 | 5/2022 | Choi et al. | |

FOREIGN PATENT DOCUMENTS

| | | |
|---|---|---|
| CN | 110134328 A | 8/2019 |
| EP | 2940691 A1 | 11/2015 |
| WO | 2008045839 A1 | 4/2008 |
| WO | 2015175720 A1 | 11/2015 |

OTHER PUBLICATIONS

Bjorling, Matias, "Zoned Namespaces in Practice" Western Digital Corporation, Flash Memory Summit, 2019, 17 pages.

Marks, Kevin, "An NVM Express Tutorial" Flash Memory Summit, 2013, 92 pages.

NVM Express, "4093—Zone Relative Data Lifetime Hint" NVM Express Technical Proposal for New Feature, 2021, 5 pages.

European Extended Search Report for Application No. 23177191.6, mailed Nov. 8, 2023.

European Extended Search Report for Application No. 23177629.5, mailed Nov. 20, 2023.

European Extended Search Report for Application No. 23180630.8, mailed Nov. 20, 2023.

Office Action for U.S. Appl. No. 18/099,250, mailed Apr. 2, 2024.

Final Office Action for U.S. Appl. No. 18/099,250, mailed Jul. 23, 2024.

Office Action for U.S. Appl. No. 18/099,250, mailed Nov. 13, 2024.

European Office Action for Application No. 23177629.5, mailed Mar. 12, 2025.

Notice of Allowance for U.S. Appl. No. 18/099,250, mailed Jun. 30, 2025.

Final Office Action for U.S. Appl. No. 18/099,250, mailed Mar. 4, 2025.

* cited by examiner

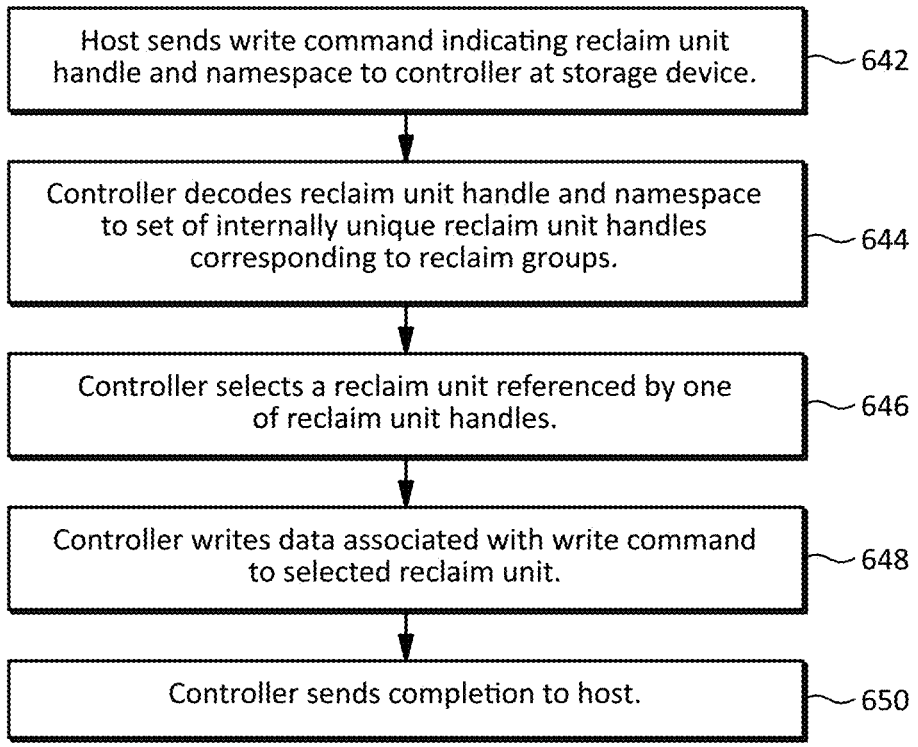

Host sends write command indicating reclaim unit handle and namespace to controller at storage device. ~642

Controller decodes reclaim unit handle and namespace to set of internally unique reclaim unit handles corresponding to reclaim groups. ~644

Controller selects a reclaim unit referenced by one of reclaim unit handles. ~646

Controller writes data associated with write command to selected reclaim unit. ~648

Controller sends completion to host. ~650

FIG. 6

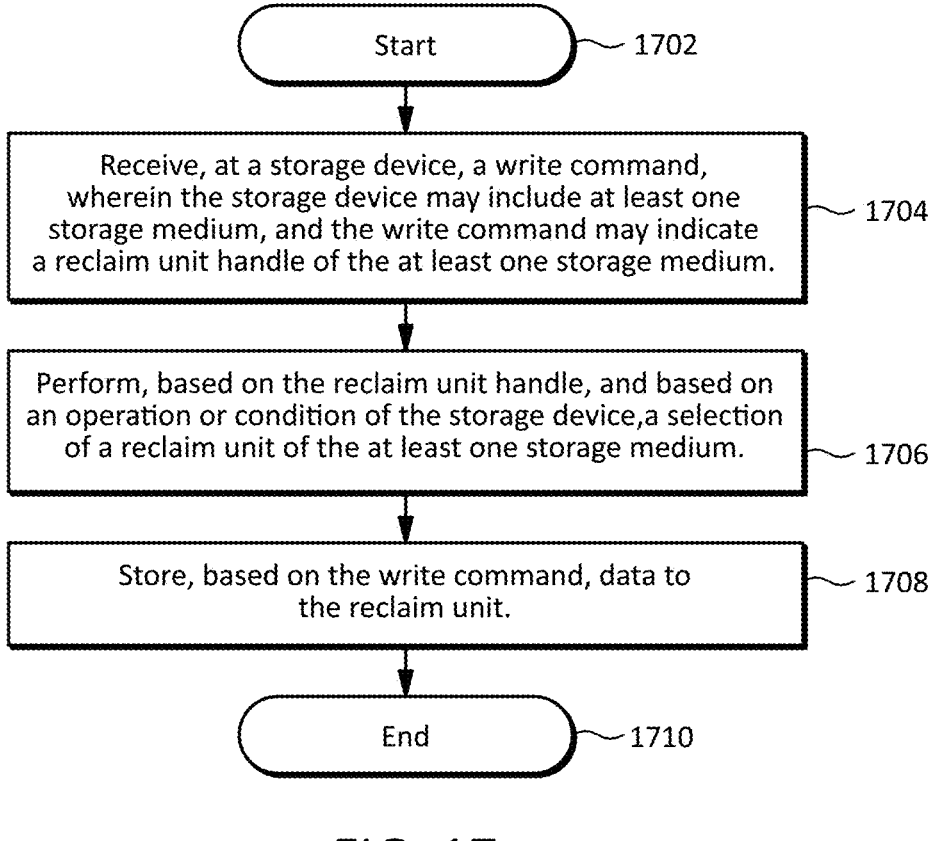

Start ─ 1702

Receive, at a storage device, a write command, wherein the storage device may include at least one storage medium, and the write command may indicate a reclaim unit handle of the at least one storage medium. ─ 1704

Perform, based on the reclaim unit handle, and based on an operation or condition of the storage device, a selection of a reclaim unit of the at least one storage medium. ─ 1706

Store, based on the write command, data to the reclaim unit. ─ 1708

End ─ 1710

SYSTEMS, METHODS, AND APPARATUS FOR DATA PLACEMENT IN A STORAGE DEVICE

REFERENCE TO RELATED APPLICATION

This application claims priority to, and the benefit of, U.S. Provisional Patent Application Ser. No. 63/358,861 filed Jul. 6, 2022, Ser. No. 63/421,994 filed Nov. 2, 2022, and Ser. No. 63/419,699 filed Oct. 26, 2022, all of which are incorporated by reference.

TECHNICAL FIELD

This disclosure relates generally to storage devices, and more specifically to systems, methods, and apparatus for data placement in storage devices.

BACKGROUND

A storage device such as a solid state drive (SSD) may store data in storage media that may be implemented with nonvolatile memory (NVM). In some nonvolatile memory, data may be updated by erasing the memory in which the data is stored and re-writing new data in the erased memory. Some nonvolatile memory may be written and/or read in units of pages but erased in units of blocks which may include multiple pages. Thus, to update data stored in a page of nonvolatile memory, valid data stored in other pages in the same block may be copied to a different block to prevent loss of the valid data when the block is erased.

The above information disclosed in this Background section is only for enhancement of understanding of the background of the inventive principles and therefore it may contain information that does not constitute prior art.

SUMMARY

An apparatus may include a storage device that may include at least one storage medium and a controller configured to control the at least one storage medium, wherein the controller may be configured to: receive a write command, wherein the write command may indicate a reclaim unit handle; perform, based on the reclaim unit handle, and based on an operation or condition of the storage device, a selection of a reclaim unit of the at least one storage medium; and store, based on the write command, data to the reclaim unit. The reclaim unit may be a first reclaim unit, the at least one storage medium may include a first reclaim group including the first reclaim unit and a second reclaim group including a second reclaim unit of the at least one storage medium, and the selection of the first reclaim unit may include performing a selection of the first reclaim group. The selection of the first reclaim unit, may be based on a namespace, and the namespace may include the first reclaim unit and the second reclaim unit. The controller may be configured to receive a placement identifier with the write command, the placement identifier may include a placement handle, and the selection of the first reclaim unit may be based on the placement handle. The placement handle may correspond to the reclaim unit handle, and the reclaim unit handle may correspond to the first reclaim unit and the second reclaim unit. The operation of the storage device may include at least one of a programming operation of the at least one storage medium, a read operation of the at least one storage medium, or an erase operation of the at least one storage medium. The operation of the storage device may include a command queuing operation for the at least one storage medium. The operation of the storage device may include a completion status of a programming operation of the at least one storage medium. The storage device may include a write buffering operation for the at least one storage medium. The operation of the storage device may include an open block operation. The condition of the storage device may include a wear state of at least a portion of the at least one storage medium. The at least one processor may be configured to determine the condition of the storage device based on a behavior of at least a portion of the at least one storage medium. The at least one processor may be configured to receive an indication from a host, and perform the selection of the reclaim unit based on the indication. The indication may include at least one of bandwidth information for the data or quality of service information for the data. The indication may include access information for the data. The indication may include allocation information for the data.

A method may include: receiving, at a storage device, a write command, wherein the storage device may include at least one storage medium, and the write command may indicate a reclaim unit handle of the at least one storage medium; performing, based on the reclaim unit handle, and based on an operation or condition of the storage device, a selection of a reclaim unit of the at least one storage medium; and storing, based on the write command, data to the reclaim unit. The reclaim unit may be a first reclaim unit, the at least one storage medium may include a first reclaim group including the first reclaim unit and a second reclaim group including a second reclaim unit, and the performing the selection of the first reclaim unit may include performing a selection of the first reclaim group.

An apparatus may include at least one processor configured to send a write command indicating a reclaim unit handle for a reclaim unit of at least one storage medium, and send an indication about data to store in the reclaim unit based on the write command. The indication may include one or more of bandwidth information for the data, quality of service information for the data, access information about the data, or allocation information about the data.

An apparatus may include a storage device that may include at least one storage medium and a controller configured to: control the at least one storage medium; receive a data operation request; receive an indication of a reclaim unit of the at least one storage medium; and perform, based on the data operation request, a data operation associated with the reclaim unit, wherein the data operation is based on an operation or condition of the storage device. The data operation may include a write operation. The data operation may include a sanitize operation. The indication of the reclaim unit, may include a reclaim unit handle. The indication of the reclaim unit may include an indication of a reclaim unit handle. The indication of the reclaim unit may include an indication of a reclaim group. The data operation may include at least one of a write operation, a read operation, a copy operation, a deallocate operation, a sanitize operation, an erase operation, a format operation, or a compare and write operation.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 6 illustrates an embodiment of a method for servicing a write command using a flexible data placement scheme in accordance with example embodiments of the disclosure.

FIG. 17 illustrates an embodiment of a method for flexible data placement for a storage device in accordance with example embodiments of the disclosure.

DETAILED DESCRIPTION

Figure 1A:
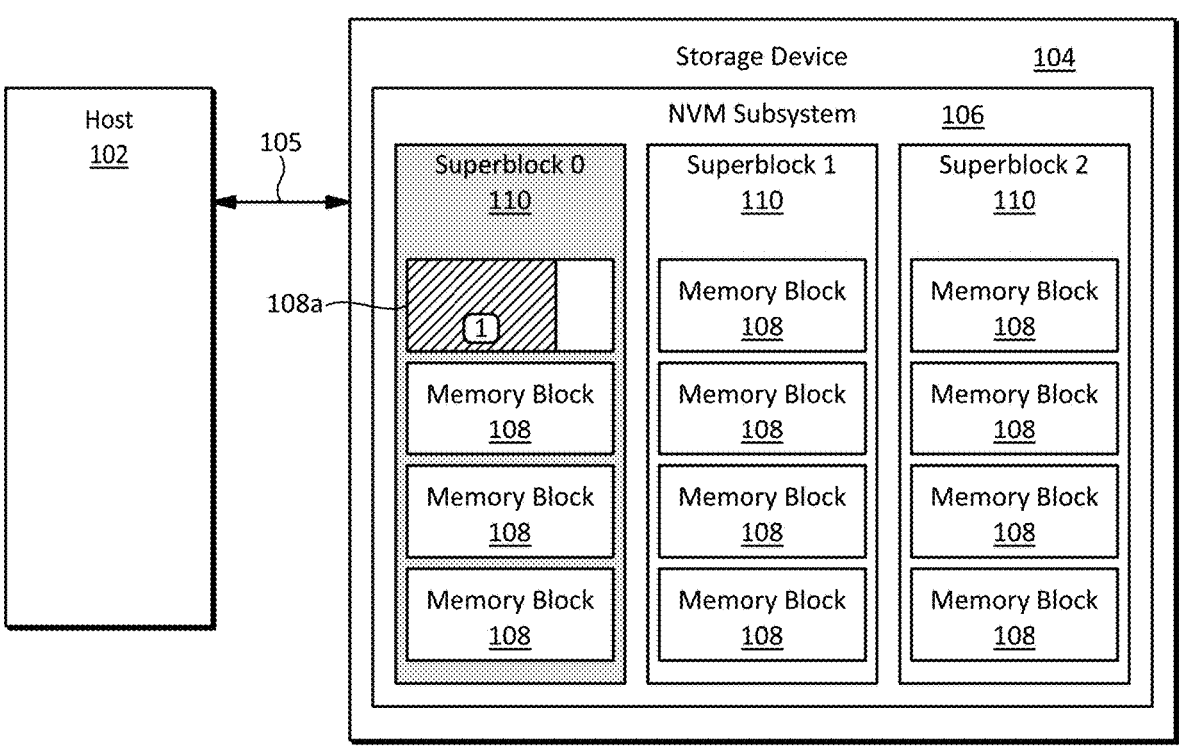
FIG. 1A illustrates an embodiment of a data placement scheme for a storage device in a first data placement state in accordance with example embodiments of the disclosure.

A storage device may implement a flexible data placement (FDP) scheme that may enable a host to arrange data into one or more reclaim units (RUs) in the storage device. A reclaim unit may be implemented with a portion of physical storage media (e.g., one or more erase blocks) that may be erased as a unit. This may reduce write amplification, for example, by enabling the host to place data that is likely to be deallocated at the same time in the same reclaim unit.

Depending on the implementation details, however, one or more ongoing operations and/or conditions of the storage device may adversely affect one or more operations involving a reclaim unit. For example, the host may send a write command that specifies a reclaim unit for storing data associated with the write command. However, the storage device may have implemented the specified reclaim unit with physical storage media (e.g., a nonvolatile memory (NVM) die) that may be busy with a read operation. Thus, the write operation requested by the host may be delayed until the read operation is completed.

In a flexible data placement scheme in accordance with example embodiments of the disclosure, a storage device may select a reclaim unit based on one or more operations and/or conditions of the storage device. For example, if a storage device receives a write command that specifies a reclaim unit for storing data associated with the write command, and the specified reclaim unit is implemented with physical storage media that is busy with a read operation, the storage device may select a different reclaim unit for storing the data associated with the write command. Depending on the implementation details, this may reduce or eliminate a delay in processing a write command associated with waiting for the read operation to complete.

In some embodiments, a reclaim unit may appear to a host as a logical representation of storage media identified by a reclaim unit handle. The storage device may implement the reclaim unit corresponding to the reclaim unit handle using physical storage media determined by the storage device.

In some embodiments, one or more reclaim nits may be arranged in one or more reclaim groups (RGs). In such an embodiment, a host may specify a reclaim unit using a reclaim group identifier (e.g., that may indicate a reclaim group) and a reclaim unit handle (e.g., that may indicate a reclaim unit within the reclaim group). Moreover, in such an embodiment, a reclaim unit handle may map to corresponding reclaim units in more than one reclaim group. For example, a reclaim unit handle may map to a reclaim unit in each reclaim group. Thus, in some embodiments having reclaim groups, if a storage device receives a command that specifies a reclaim unit handle but not a valid reclaim group indicator, the storage device may select a reclaim unit by selecting a reclaim group and using the reclaim unit that the reclaim unit handle maps to within the selected reclaim group. In some embodiments, a command may specify a reclaim unit handle indirectly, for example, using a placement handle that, in turn, may map to a reclaim group and reclaim unit handle. Additionally, or alternatively, if a storage device receives a command that does not specify a reclaim group or a reclaim unit handle, the storage device may select a reclaim unit, for example, using a default reclaim unit handle and/or a default placement handle. Additionally, or alternatively, if a storage device receives a command that specifies a valid reclaim group and/or a valid reclaim unit handle, but the reclaim group does not include a usable reclaim group (e.g., because all of the reclaim units in the reclaim group have been used), the storage device may select a reclaim group and/or reclaim unit, for example, using a default reclaim group, a default reclaim unit handle, and/or a default placement handle.

In some embodiments, the storage device may select the reclaim group, and therefore the corresponding reclaim unit within the selected reclaim group, based on one or more operations and/or conditions of the storage device.

In some embodiments, a storage device may select a reclaim unit and/or reclaim group based on an ongoing operation such as a die operation, a channel operation, a storage device controller operation, and/or the like. For example, if a storage device receives a write command that specifies a reclaim unit handle that currently maps to a reclaim unit and/or reclaim group that is implemented with physical storage media that is currently busy with an operation (e.g., write, read, and/or erase) that may delay the write command, the storage device may select a different reclaim unit and/or reclaim group that may be available sooner to use for the write command. As another example, if a reclaim unit handle that currently maps to a reclaim unit and/or reclaim group having a relatively long queue of commands, the storage device may select a different reclaim unit and/or reclaim group that may have a command queue with no or fewer pending commands. As a further example, to service a write command, a storage device may select a reclaim unit and/or reclaim group based on an opportunistic status such as an NVM die that is approaching the completion of a programming cycle, an associated write buffer that is nearing a full word line, and/or an open block timer that is nearing expiration. As a further example, if a storage device receives a write command that specifies a reclaim group that does not have adequate available space in one or more reclaim units to store new write data (e.g., the reclaim group has run out of empty reclaim units), the storage device may select a different reclaim group (and one or more reclaim units with the selected reclaim group).

Additionally, or alternatively, a storage device may select a reclaim unit and/or reclaim group based on a condition of storage media that may be used by the reclaim unit and/or reclaim group. For example, in some embodiments, a storage device may avoid selecting a reclaim unit and/or reclaim group in which an NVM die may be exhibiting end-of-life (EOL) behavior such as relatively low operation speed, relatively high bit error accumulation rate, sense voltage shifts, and/or the like. Additionally, or alternatively, to service a write command, a storage device may select a reclaim unit and/or reclaim group in which the physical storage media may exhibit relatively young behavior.

Additionally, or alternatively, a storage device may select a reclaim unit and/or reclaim group based on one or more indications received from a host. For example, to service a write command received from a host, a storage device may consider any number of the following indications it may receive from the host to select a reclaim unit and/or reclaim group: emphasis on read quality-of-service (QoS), emphasis on read bandwidth (BW), emphasis on write bandwidth, read and/or write bandwidth throttle targets, whether any write data associated with the write command is relatively hot and/or cold, whether some or all of the write data associated with the write command may be deallocated together, and/or the like.

This disclosure encompasses numerous inventive principles relating to flexible data placement. The principles disclosed herein may have independent utility and may be embodied individually, and not every embodiment may utilize every principle. Moreover, the principles may also be embodied in various combinations, some of which may amplify some benefits of the individual principles in a synergistic manner.

For purposes of illustration, some embodiments may be described in the context of specific implementation details such as storage devices implemented with solid state drives (SSDs) using not-AND (NAND) flash memory, a Nonvolatile Memory Express (NVMe) protocol, and/or the like. The inventive principles, however, are not limited to these or any other implementation details. For example, some embodiments may implement storage media with flash memory, magnetic media, storage class memory (SCM), and/or the like, or any combination thereof.

In some embodiments in which storage media may be implemented at least partially with flash memory, a reclaim unit may refer to one or more erase blocks, NVM devices (e.g., NVM dies) and/or the like, or any combination thereof, and a reclaim group may refer to one or more reclaim units, one or more NVM device partitions (e.g., planes), one or more NVM devices (e.g., NVM dies), one or more storage devices (e.g., storage drives), and/or the like, or any combination thereof.

In some embodiments in which storage media may be implemented at least partially with magnetic media (e.g., shingled magnetic recording (SMR) media), a reclaim unit may refer to one or more shingle sections, zones, sectors, tracks, and/or the like, or any combination thereof, and a reclaim group may refer to one or more disks (e.g., drives), platters, tracks, zones, sectors, shingle sections, and/or the like, or any combination thereof.

In some embodiments in which storage media may be implemented at least partially with storage class memory (e.g., magnetoresistive random-access memory (MRAM), resistive random-access memory (ReRAM), phase change memory (PCM), cross-gridded nonvolatile memory, memory with bulk resistance change, and/or the like), a reclaim unit may refer to one or more banks, programming groups, and/or the like, or any combination thereof, and a reclaim group may refer to one or more die, banks, programming groups, and/or the like, or any combination thereof.

As another example, the inventive principles are not limited to use with write commands, but may be applied to any type of request for a data operation involving data locality, for instance, in any type of scheme involving data that may be placed based on logical to physical mapping a logical representation of physical storage media such as a logical block address to physical block address (LBA-to-PBA or L2P) mapping). For example, a storage device may receive any type of data operation request such as a request for a write operation (e.g., a write command, write zeros, write ones, write uncorrectable, and/or the like), a copy operation, a deallocate operation (e.g., an unmap, a trim, and/or the like), a sanitize operation, an erase operation, a format operation, a compare and write operation (which may be referred to as a fused command, e.g., a pair of commands that may include a read command to read data for a comparison operation and a write command that may execute based on a result of the comparison operation), and/or the like. In some embodiments, a data operation request may include an indication relating to data locality in storage media a reclaim unit handle, a reclaim group, and/or the like). Based on receiving a data operation request with an indication relating to data locality in storage media, the storage device may perform a corresponding data operation based on one or more operations and/or conditions of the storage device.

Figure 1B:
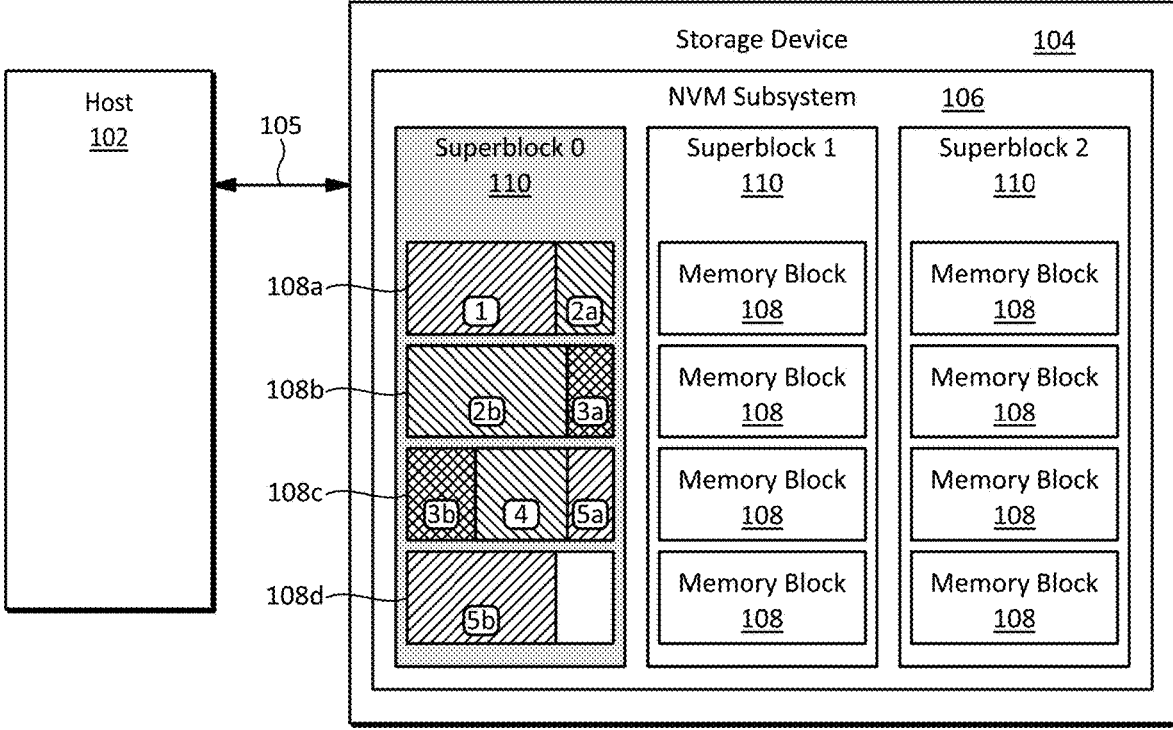
FIG. 1B illustrates the embodiment of the data placement scheme illustrated in FIG. 1A in a second data placement state in accordance with example embodiments of the disclosure.
Figure 1C:
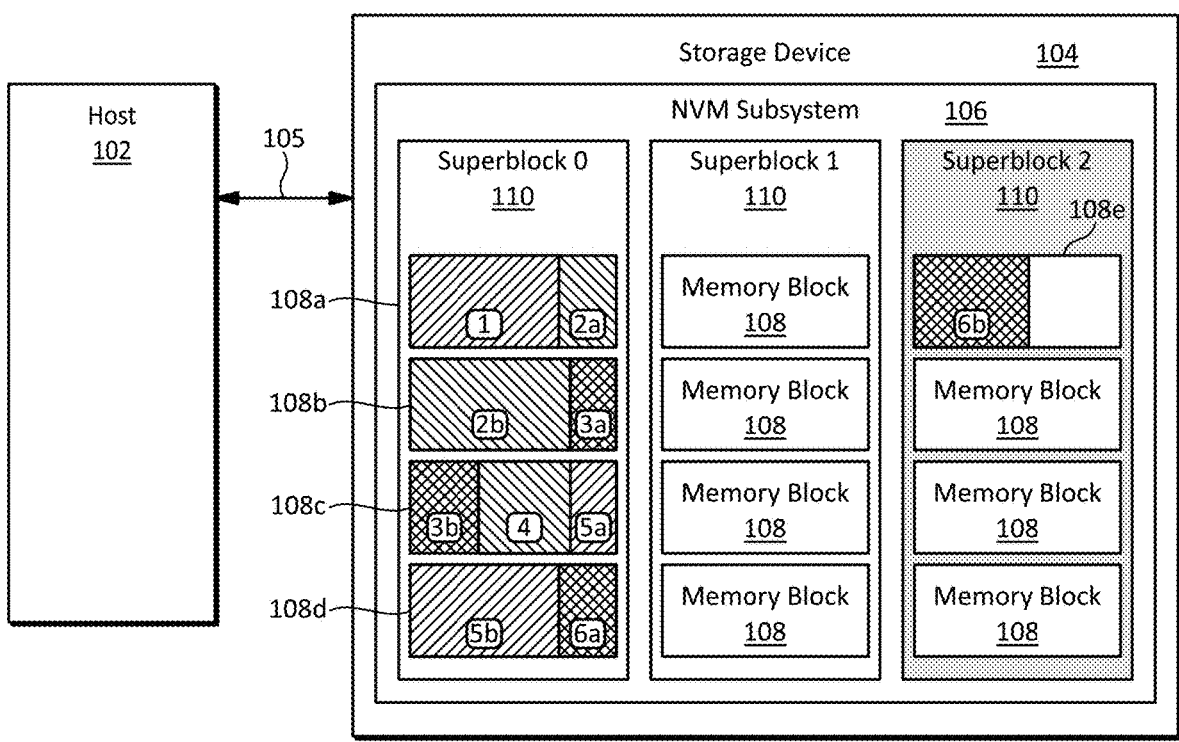
FIG. 1C illustrates the embodiment of the data placement scheme illustrated in FIG. 1A in a third data placement state in accordance with example embodiments of the disclosure.
Figure 1D:
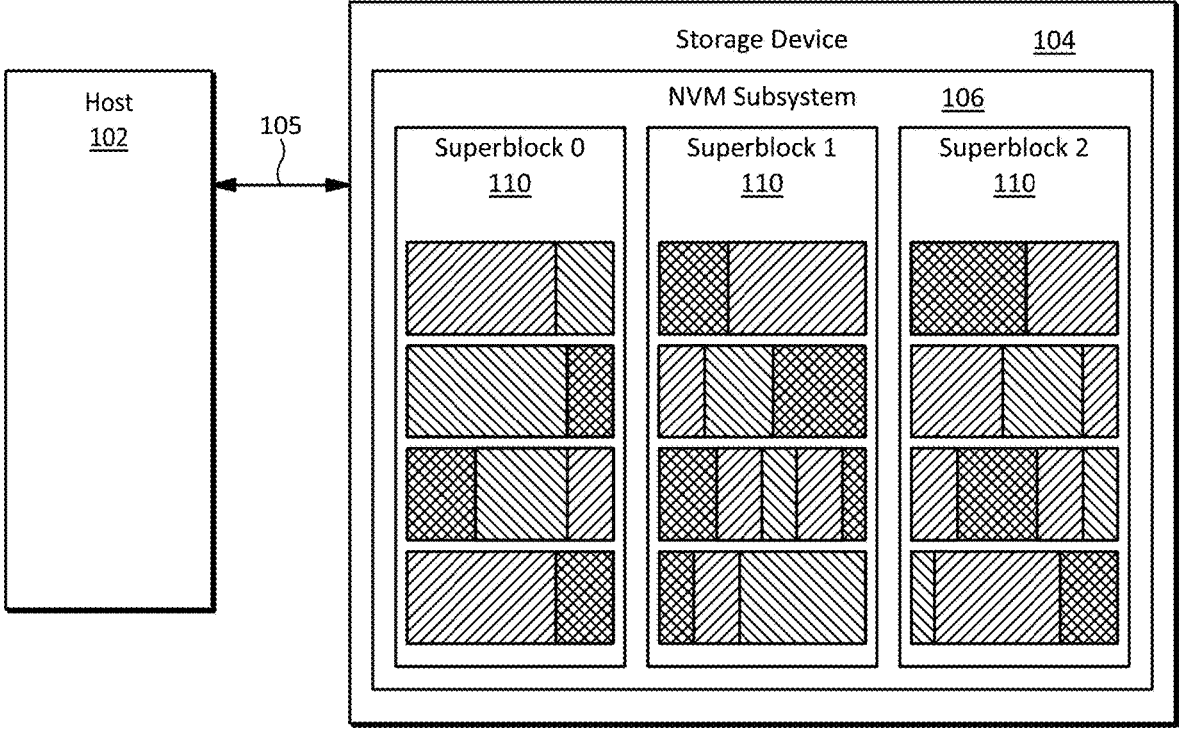
FIG. 1D illustrates the embodiment of the data placement scheme illustrated in FIG. 1A in a fourth data placement state in accordance with example embodiments of the disclosure.
Figure 1E:
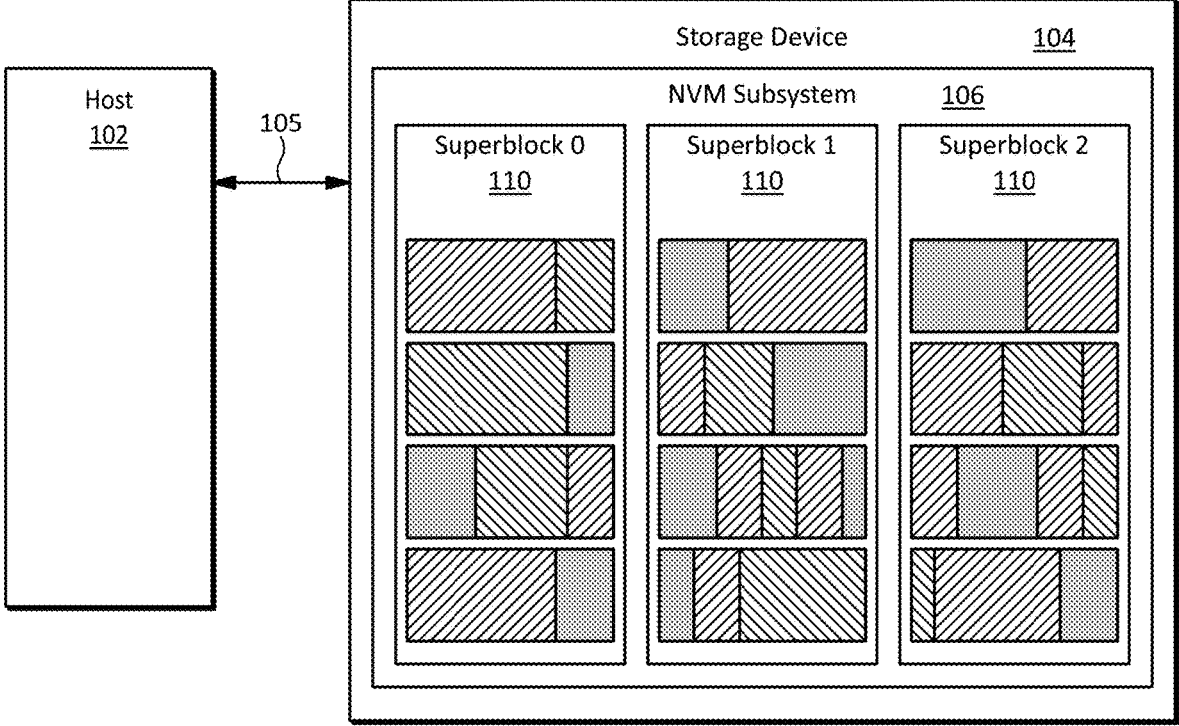
FIG. 1E illustrates the embodiment of the data placement scheme illustrated in FIG. 1A in a fifth data placement state in accordance with example embodiments of the disclosure.

FIG. 1A illustrates an embodiment of a data placement scheme for a storage device in a first data placement state in accordance with example embodiments of the disclosure. FIG. 1B illustrates the embodiment of the data placement scheme illustrated in FIG. 1A in a second data placement state in accordance with example embodiments of the disclosure. FIG. 1C illustrates the embodiment of the data placement scheme illustrated in FIG. 1A in a third data placement state in accordance with example embodiments of the disclosure. FIG. 1D illustrates the embodiment of the data placement scheme illustrated in FIG. 1A in a fourth data placement state in accordance with example embodiments of the disclosure. FIG. 1E illustrates the embodiment of the data placement scheme illustrated in FIG. 1A in a fifth data placement state in accordance with example embodiments of the disclosure.

FIG. 1A, FIG. 1B, FIG. 1C, FIG. 1D, and/or FIG. 1E may be referred to collectively and/or individually as FIG. 1.

The embodiment illustrated in FIG. 1 may include a host 102 and a storage device 104 communicating using a communication connection 105. The storage device 104 may include storage media in an NVM subsystem 106 having memory blocks 108 arranged in superblocks 110. The memory blocks 108 may be implemented with non-volatile memory that may be erased in units of the blocks illustrated in FIG. 1 and thus may also be referred to as erase blocks. The memory blocks 108 may be programmed (e.g., written) and/or read in units of pages and/or word lines which may be smaller than memory blocks. The memory blocks 108 may be erased before pages and/or word lines of data may be written into them. The memory blocks 108 may be arranged in superblocks 110, for example, to simplify management of the blocks 108. Thus, the nonvolatile memory illustrated in FIG. 1 may be erased in units of superblocks 110.

The storage device 104 may receive input and/or output (I/O or IO) requests (which may also be referred to as commands) from the host 102 to enable the host to access the NVM subsystem (e.g., write data into the storage media and/or read data from the storage media). The host 102 may divide the data into namespaces indicated by the different types of shading illustrated in FIG. 1. Specifically, data belonging to a first namespace (which may be indicated as namespace identifier 1 (NSID 1)) may be indicated by shading with diagonal lines from top right to bottom left, data belonging to a second namespace (which may be indicated as NSID 1) may be indicated by shading with diagonal lines from top left to bottom right, and data belonging to a third namespace (which may be indicated as namespace NSID 3) may be indicated by diagonal cross-shading. In some embodiments, in addition to namespaces, and/or as an alternative to namespaces, the host 102 may divide and/or arrange the data into groups based on logical block addresses (LBAs), one or more applications that may use the data, host write traffic threads, and/or the like, for separating and/or managing data based on reclaim unit handles, reclaim units, erase units, and/or the like.

Referring to FIG. 1A, memory blocks 108 may initially be in an erased state as shown by the absence of shading. The NVM subsystem 106 may identify an erased superblock (e.g., Superblock 0 indicated by solid shading) into which write data may be placed. The storage device 104 may receive a first write command with write data belonging to NSID 3. The NVM subsystem 106 may place the data belonging to NSID 1 (indicated by the number 1 in a rounded rectangle) in a first memory block 108a of Superblock 0 as illustrated in FIG. 1A. (The number 1 may indicate a sequence in which the data may be placed rather than the NSID.)

Referring to FIG. 1B, the storage device 104 may continue receiving additional write commands from the host 102 with write data belonging to various namespaces. The NVM subsystem 106 may fill the memory blocks 108a-108d in Superblock 0 by placing the write data in the sequence indicated by the numbers in the rounded rectangles. In some cases, the quantity of write data is larger than the space remaining in a memory block. Thus, a first portion of the write data may be placed so as to fill the remaining space in a first memory block, and a second portion may be placed in an empty memory block. For example, as shown in FIG. 1B, based on receiving a second write command, a first portion 2a of data belonging to NSID 2 may be used to fill the remaining space in memory block 108a, and a second portion 2b of data belonging to NSID 2 may be placed in memory block 108b. The NVM subsystem 106 may continue placing write data into Superblock 0 until Superblock 0 is full or nearly full as shown in FIG. 1B.

Referring to FIG. 1C, the storage device 104 may receive a sixth write command with data belonging to NSID 3 that is too large to fit in the remaining space in memory block 108d in Superblock 0. Thus, the NVM subsystem 106 may select a new empty superblock (e.g., Superblock 2 indicated by solid shading) into which write data may be placed. The NVM subsystem 106 may use a first portion 6a of data belonging to NSID 3 to fill the remaining space in memory block 108d, and a second portion 6b of data belonging to NSID 3 may be placed in memory block 108e in Superblock 2. The NVM subsystem 106 may continue placing write data into Superblock 2, and then Superblock 1, with data belonging to different namespaces mixed within one or more superblocks as shown in FIG. 1D. Data belonging to different namespaces may be mixed within blocks 108 and/or superblocks 110, for example, because the host 102 may be unaware of, and/or have no control over, the manner in which the NVM subsystem 106 places data within the blocks 108 and/or superblocks 110.

The host 102 may divide data into namespaces, for example, to provide isolation between sources of data such as applications, processes, logical block address (LBA) range, and/or the like. Thus, the host 102 may deallocate some or all data belonging to a namespace at the same time, for example, when an application terminates.

FIG. 1E illustrates an example in which the host 102 has deallocated data belonging to the namespace indicated as NSID 3 which is shown with solid shading after deallocation. Reusing the deallocated storage space may involve erasing the deallocated storage space. However, because superblocks 110 may be erased as units, the NVM subsystem 106 may move the remaining valid data in a superblock to a different superblock to prevent loss of the valid data when the superblock is erased. Depending on the implementation details, this may result in write amplification that may reduce the useful life of the storage media.

Figure 2A:
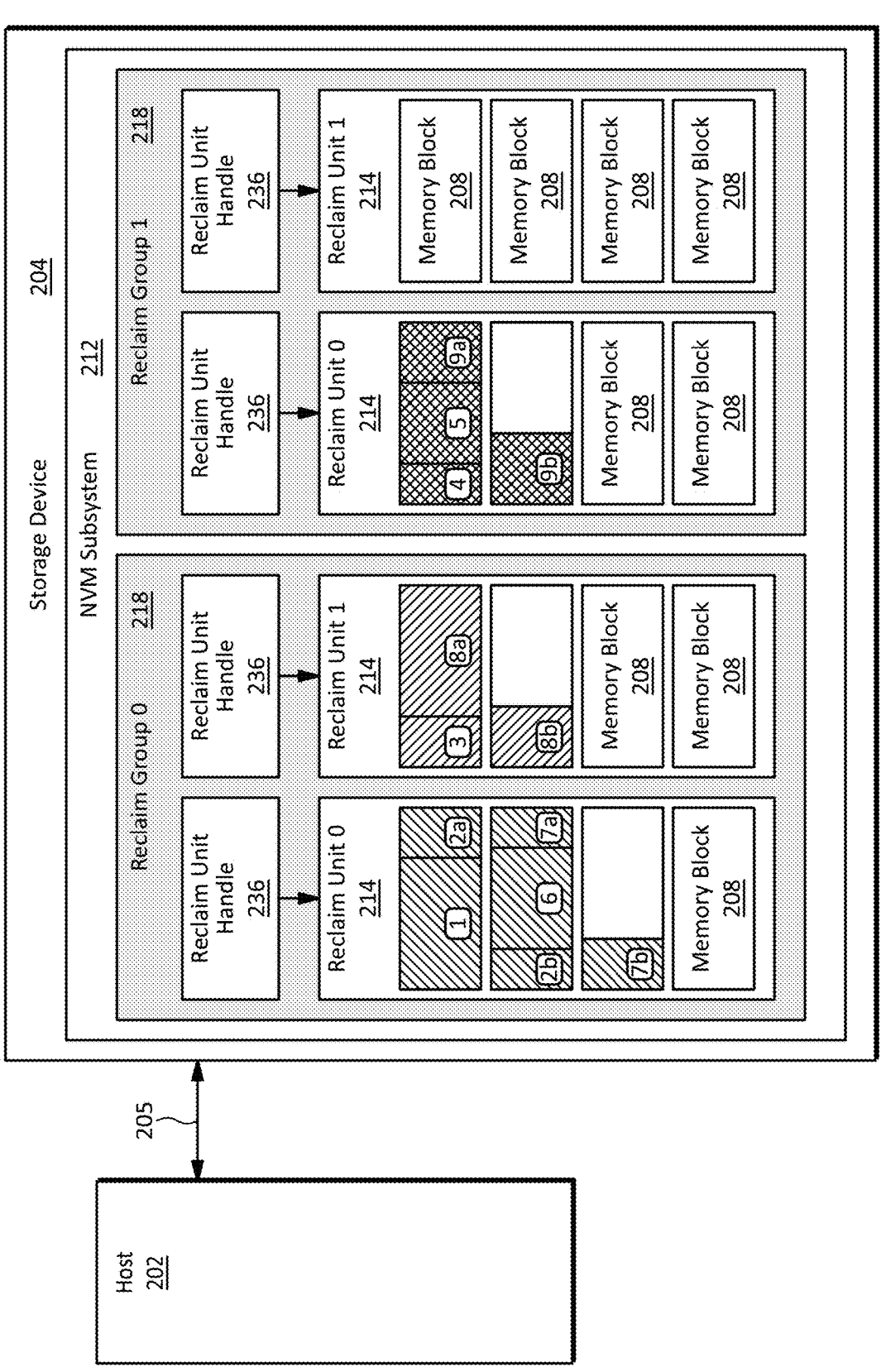
FIG. 2A illustrates an embodiment of a flexible data placement scheme for a storage device in a first data placement state in accordance with example embodiments of the disclosure.
Figure 2B:
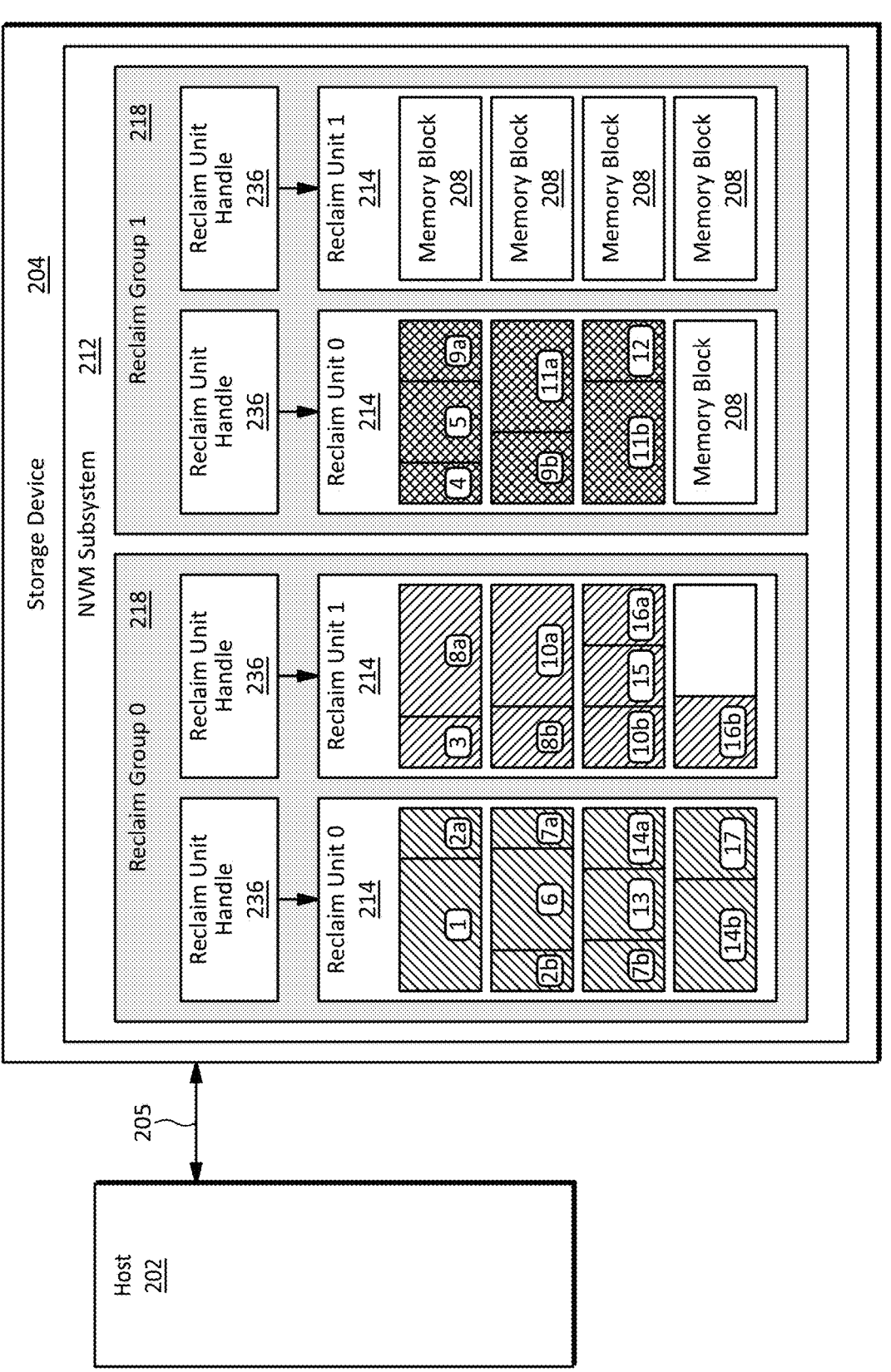
FIG. 2B illustrates the embodiment of the data placement scheme illustrated in FIG. 2A in a second data placement state in accordance with example embodiments of the disclosure.
Figure 2C:
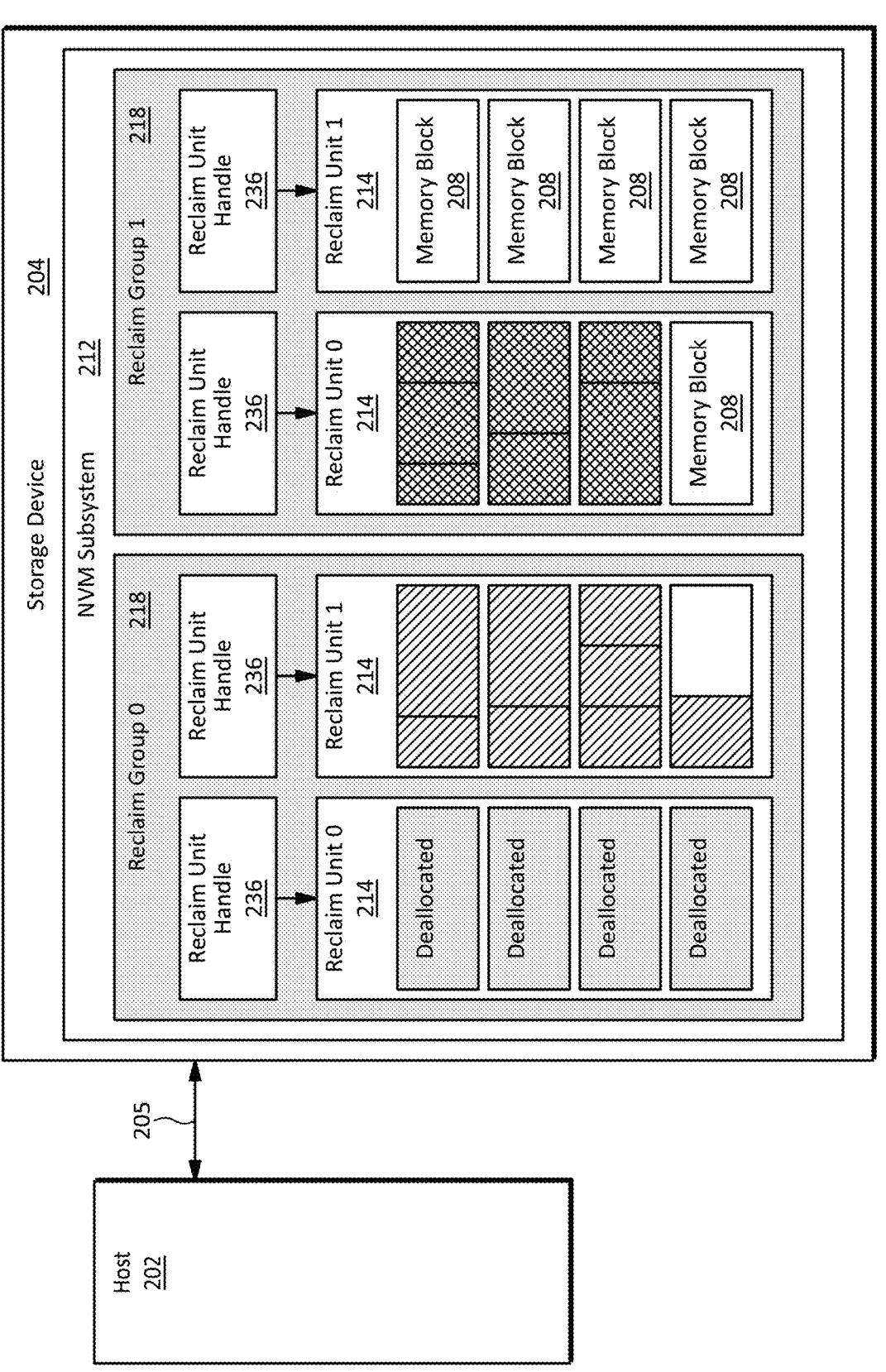
FIG. 2C illustrates the embodiment of the data placement scheme illustrated in FIG. 2A in a third data placement state in accordance with example embodiments of the disclosure.
Figure 2D:
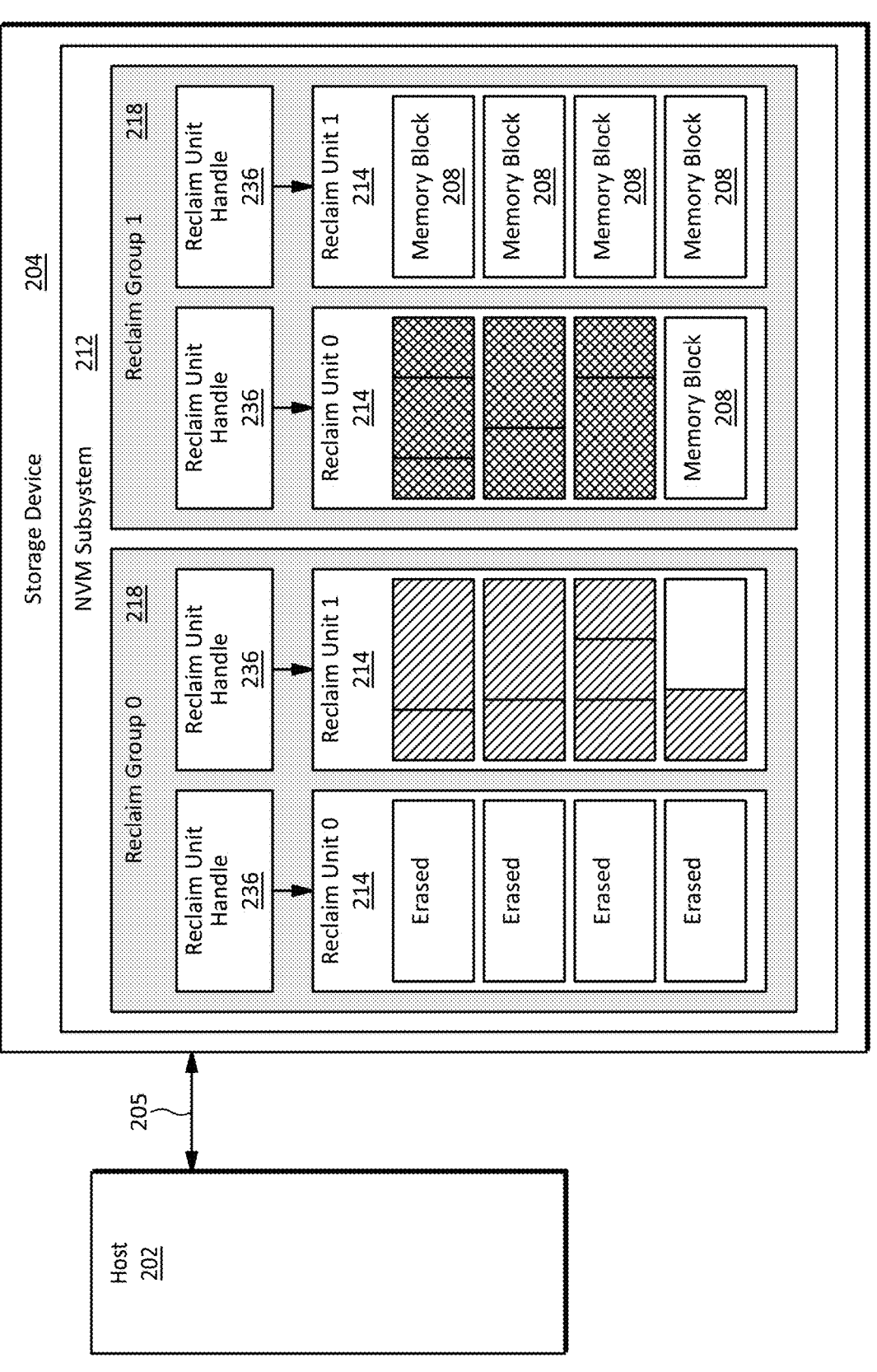
FIG. 2D illustrates the embodiment of the data placement scheme illustrated in FIG. 2A in a fourth data placement state in accordance with example embodiments of the disclosure.

FIG. 2A illustrates an embodiment of a flexible data placement scheme for a storage device in a first data placement state in accordance with example embodiments of the disclosure. FIG. 2B illustrates the embodiment of the data placement scheme illustrated in FIG. 2A in a second data placement state in accordance with example embodiments of the disclosure. FIG. 2C illustrates the embodiment of the data placement scheme illustrated in FIG. 2A in a third data placement state in accordance with example embodiments of the disclosure. FIG. 2D illustrates the embodiment of the data placement scheme illustrated in FIG. 2A in a fourth data placement state in accordance with example embodiments of the disclosure.

FIG. 2A, FIG. 2B, FIG. 2C, and/or FIG. 2D may be referred to collectively and/or individually as FIG. 2.

The embodiment illustrated in FIG. 2 may include some components such as a host 202, a storage device 204, a communication connection 205, and/or memory blocks 208 which, in some aspects, may operate in a manner similar to the corresponding components in the embodiment illustrated in FIG. 1. However, in the embodiment illustrated in FIG. 2, memory blocks 208 in the NVM subsystem 212 may be arranged in one or more reclaim units 214 that may be erased as a unit and may include one or more memory blocks 208. A reclaim unit 214 may be implemented, for example with one or more erase blocks, superblock, and/or the like. Moreover, the reclaim units 214 may be identified by corresponding reclaim unit handles 236 that may enable the host 202 to specify (e.g., in a field of a write command) a specific reclaim unit 214 to use for storing the write data associated with the write command. In some embodiments, some or all of the reclaim units 214 may be arranged in one or more reclaim groups 218 which the host may also specify, for example, using one or more corresponding reclaim group identifiers (e.g., in a field of a write command). In some embodiments, a reclaim unit handle 236 may identify more than one reclaim unit 216. For example, a reclaim unit handle 236 may identify (e.g., map to) one or more reclaim units 216 in one or more (e.g., each) reclaim group 218 (e.g., in a manner similar to that illustrated in FIG. 4.)

Thus, by specifying specific reclaim units 214 and/or reclaim groups 218 to use for storing data associated with write commands, the host 202 may cause the NVM subsystem 212 to only store data belonging to one or more specific namespaces in one or more reclaim units 214 and/or reclaim groups 218.

For example, referring to FIG. 2A, the host 202 may instruct the NVM subsystem 212 to store data belonging to namespaces indicated by NSID 1, NSID 2, and NSID 3 in Reclaim Unit 0, Reclaim Unit 1, and Reclaim Unit 2, respectively, in the sequence indicated by the numbers in the rounded rectangles in FIG. 2 and indicated by the numbers in brackets as follows. For example, data [1] for a first write command associated with NSID 1 may be written to a first portion of the top memory block 208 of Reclaim Unit 0 of Reclaim Group 0. A first portion of data [2a] for a second write command associated with NSID 1 may be written in the remaining portion of the top memory block 208 of Reclaim Unit 0 of Reclaim Group 0, and a second portion of data [2b] for the second write command associated with NSID 1 may be written in a first portion of the second memory block 208 from the top of Reclaim Unit 0 of Reclaim Group 0. Data [3] for a third write command associated with NSID 2 may be written to a first portion of the top memory block 208 of Reclaim Unit 1 of Reclaim Group 0. Data [4] for a fourth write command associated with NSID 3 may be written to a first portion of the top memory block 208 of Reclaim Unit 0 of Reclaim Group 1. Data [5] for a fifth write command associated with NSID 3 may be written to a next portion of the top memory block 208 of Reclaim Unit 0 of Reclaim Group 1. Data [6] for a sixth write command associated with NSID 1 may be written to a next portion of the second memory block 208 from the top of Reclaim Unit of Reclaim Group 0. A first portion of data [7a] for a seventh write command associated with NSID 1 may be written in the remaining portion of the second memory block 208 from the top of Reclaim Unit 0 of Reclaim Group 0, and a second portion of data [7b] for the seventh write command associated with NSID 1 may be written in a first portion of the third memory block 208 from the top of Reclaim Unit 0 of Reclaim Group 0. A first portion of data [8a] for an eighth write command associated with NSID 2 may be written in the remaining portion of the top memory block 208 of Reclaim Unit 1 of Reclaim Group 0, and a second portion of data [8b] for the eighth write command associated with NSID 2 may be written in a first portion of the second memory block 208 from the top of Reclaim Unit 1 of Reclaim Group 0. A first portion of data [9a] for a ninth write command associated with MID 3 may be written in the remaining portion of the top memory block 208 of Reclaim Unit 0 of Reclaim Group 1, and a second portion of data [9b] for the ninth write command associated with NSID 3 may be written in a first portion of the second memory block 208 from the top of Reclaim Unit 0 of Reclaim Group 1.

Referring to FIG. 2B, the host 202 may continue sending write commands and associated write data that it may instruct the NVM subsystem 212 to store in reclaim units corresponding to the respective namespaces using write commands in the sequence indicated by the numbers in the rounded rectangles which may correspond to data for the associated write commands.

Referring to FIG. 2C, the host may deallocate some or all of the data belonging to NSID 1 as shown by solid shading. For example, the data associated with any of the first, second, sixth, seventh, thirteenth, fourteenth, and/or seventeenth write commands may be deallocated at different times (with various amounts of time therebetween), in various combinations at different times, or all at once. Depending on the implementation details, this may enable the NVM subsystem 212 to erase Reclaim Unit 0 (as shown without shading in FIG. 2D) without moving data belonging to other namespaces, thereby reducing or eliminating write amplification. Although FIG. 2D may illustrate a reclaim unit handle 236 referencing a reclaim unit 214 having one or more memory blocks 208 that may be erased, in some embodiments, one or more deallocated memory blocks 208 may be returned to a pool of available memory prior to being erased. Thus, in some embodiments, the memory blocks 208 indicated as being erased in FIG. 2D may not be the same memory blocks indicated as being deallocated in FIG. 2C but instead may be other memory blocks that may have previously been erased and arranged into a new (e.g., empty) reclaim unit 214. In some embodiments, in addition to namespaces, and/or as an alternative to namespaces, data may be divided and/or arranged into groups based on logical block addresses (LBAs), one or more applications that may use the data, host write traffic threads, and/or the like, for separating and/or managing data based on reclaim unit handles, reclaim units, erase units, and/or the like.

Figure 3:
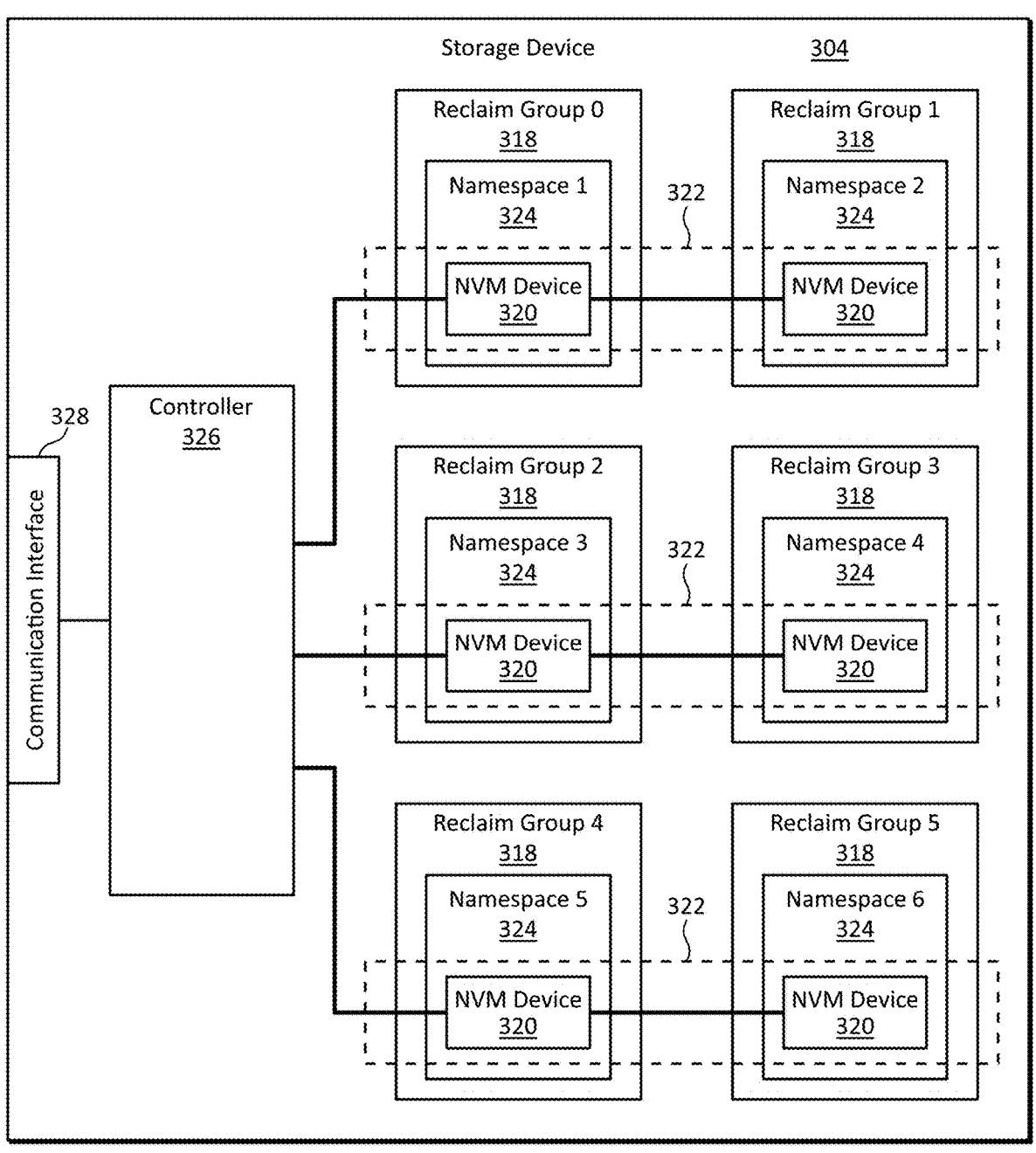
FIG. 3 illustrates an embodiment of a flexible data placement scheme having namespaces corresponding to reclaim groups in accordance with example embodiments of the disclosure.

FIG. 3 illustrates an embodiment of a flexible data placement scheme having namespaces corresponding to reclaim groups in accordance with example embodiments of the disclosure. In the embodiment illustrated in FIG. 3, a storage device 304 may include storage media implemented with nonvolatile memory devices (e.g., NVM dies) 320 arranged in one or more channels 322. The nonvolatile memory devices 320 may be controlled by a storage device controller 326, which may also be referred to as a controller. The storage device 304 may communicate with a host using a communication interface 328.

The storage device 304 may implement a flexible data placement scheme in which a host may specify a reclaim group and/or reclaim unit to use for storing data associated with a write command sent from the host to the controller 326. In the embodiment illustrated in FIG. 3, one or more namespaces 324 may be associated with one or more NVM devices 320 (e.g., each namespace 324 may be associated with a corresponding NVM device 320). One or more reclaim groups 318 may be associated with one or more namespaces 324 (e.g., each reclaim group 318 may be associated with a corresponding namespace 324). In some implementations, a reclaim group 318 may be implemented with one or more reclaim units as shown, for example, in the embodiment illustrated in FIG. 2. In some implementations, a reclaim unit 324 may be implemented with two erase blocks, for example, one erase block per plane on a two-plane NVM device 320.

Depending on the implementation details, the embodiment illustrated in FIG. 3 may enable a host to spread write data across the channels 322 in any manner that it may decide. For example, a host may write data to multiple reclaim groups 318 concurrently to improve write bandwidth. As another example, a host (e.g., using application data) and/or an application, processes, and/or the like running on a host, may place data that may be deallocated together (e.g., because of being similarly aged, associated with the same application, and/or the like) in one or more common namespaces 324, reclaim groups 318, and/or the like. As a further example, a host (e.g., using application data) and/or an application, processes, and/or the like running on a host, may place data in the namespaces 324, reclaim groups 318, and/or the like in such a manner as to improve read bandwidth and/or QoS.

Figure 4:
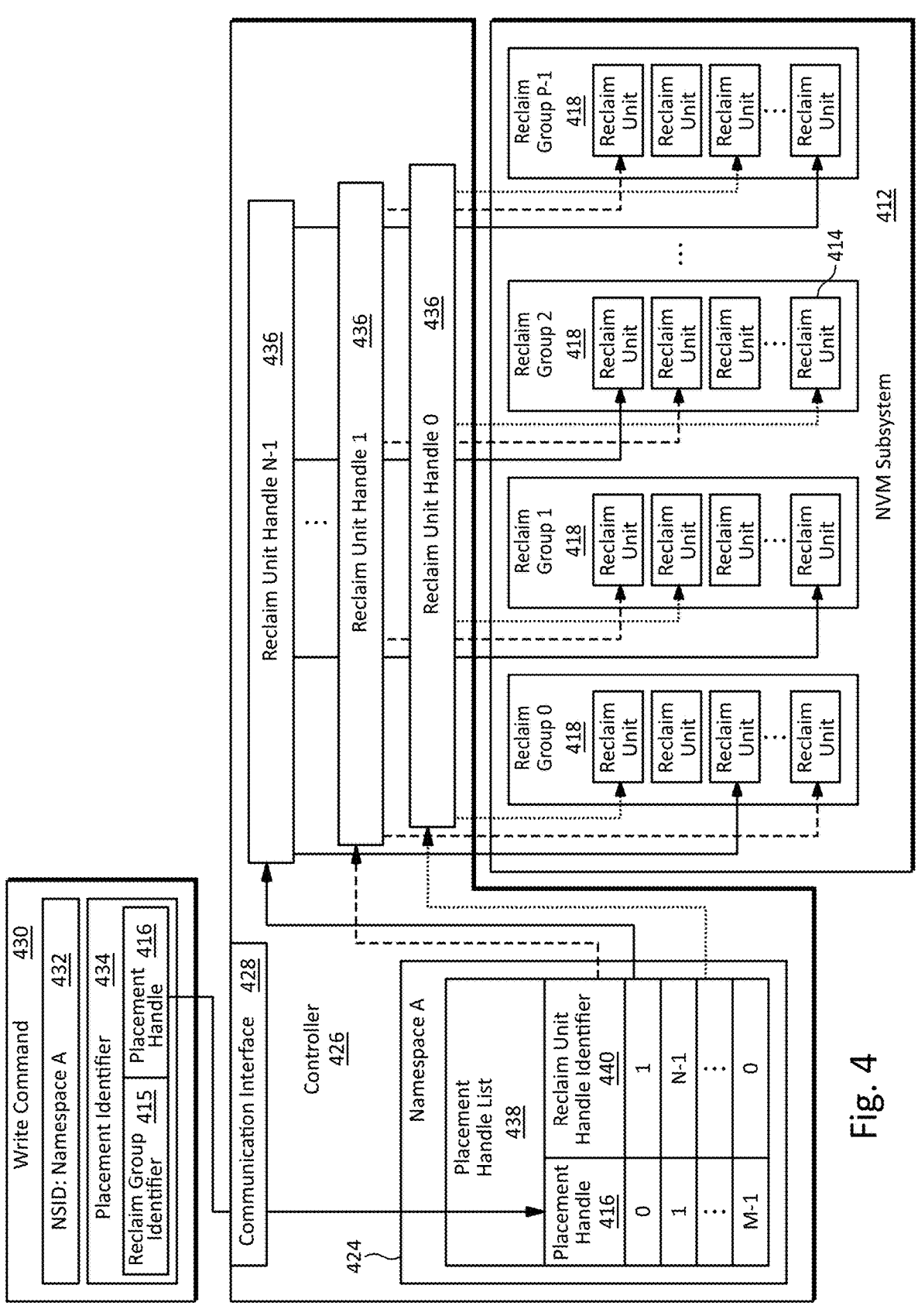
FIG. 4 illustrates an embodiment of a flexible data placement scheme having reclaim unit handles in accordance with example embodiments of the disclosure.

FIG. 4 illustrates an embodiment of a flexible data placement scheme having reclaim unit handles in accordance with example embodiments of the disclosure. The embodiment illustrated in FIG. 4 may include a controller 426 and an NVM subsystem 412. The NVM subsystem 412 may include P reclaim groups 418 identified as Reclaim Group 0 through Reclaim Group P-1. A reclaim group 418 may include one or more reclaim units 414.

The controller 426 may receive I/O commands 430 from a host through a communication interface 428. An I/O command 430, which in the example illustrated in FIG. 4 may be a write command, may include a namespace identifier (NSID) 432 and/or a placement identifier 434. The placement identifier 434 may include a reclaim group identifier 415 and/or a placement handle 416 that may enable a host to specify a reclaim group 418 and/or a reclaim unit 414, respectively, within the reclaim group 418 to use to store data associated with the write command 430. Thus, in some embodiments, the scheme illustrated in FIG. 4 may enable a host to align data that may be deallocated together (e.g., data belonging to a namespace) with one or more reclaim units 414 that may be erased as units.

In some embodiments, a placement handle 416 may map to a reclaim unit handle (RUH) 436 that may reference one or more reclaim units 414 in one or more reclaim groups 418 (e.g., a reclaim unit handle may map to one reclaim unit 414 in each reclaim group 418 as shown in the example mappings illustrated in FIG. 4). In the embodiment illustrated in FIG. 4, the controller may use N reclaim unit handles 436 identified as Reclaim Unit Handle 0 through Reclaim Unit Handle N-1. In some embodiments, the reclaim unit handles 436 may be characterized as a controller resource.

The controller 426 may use a placement handle list 438 to map one or more placement handles 416 to one or more RUH identifiers (RUH IDs) 440, which in turn may identify a corresponding reclaim unit handle 436. In the embodiment illustrated in FIG. 4, the placement handle list 438 may include M placement handles identified as Placement Handle 0 through Placement Handle M-1.

In some embodiments, a placement handle 416 may be scoped to a namespace 424 (in this example, a namespace identified as Namespace A). The namespace may, in turn, encompass one or more (e.g., all reclaim units 414 referenced by the one or more reclaim unit handles 436 identified in the placement handle list 438 (e.g., by RUH IDs 440). In some embodiments, the placement handle list 438 may be created, populated, revised, maintained, and/or the like, by a host, a storage device (e.g., the controller 426), or any other entity or combination thereof.

In some embodiments, the use of the placement handles 416 and/or reclaim unit handles 436 may enable the flexible data placement scheme illustrated in FIG. 4 to present a reclaim unit to a host as a logical representation of physical nonvolatile storage within a reclaim group that may be physically erased by the controller 426, for example, without disturbing other reclaim units 414. The controller 426 may implement a logical reclaim unit specified by a host (e.g., using a placement identifier 434) with physical storage media (e.g., one or more erase blocks on an NVM die) that may be selected by the controller 426 and erased as a unit.

In some embodiments, the selection of a reclaim unit 414 and/or reclaim group 418 may be performed, at least partially, by the controller 426. For example, if the controller 426 receives a write command 430 that does not indicate a placement identifier 434, the controller may use a reclaim unit handle 436 mapped by a default placement handle 416 (e.g., Placement Handle 0) and select a reclaim group 418, thereby selecting the reclaim unit 414 that is within the selected reclaim group 418 and referenced by the reclaim unit handle 436 mapped by the default placement handle 416. As another example, if the controller 426 receives a write command 430 with a placement identifier that includes a placement handle 416 but not a reclaim group identifier 415, the controller 426 may select a reclaim unit 414 by selecting a reclaim group 418 and using the reclaim unit 414 that is within the selected reclaim group 418 and referenced by the reclaim unit handle 436 mapped by the placement handle 416 provided with the write command 430.

In some embodiments, the flexible data placement scheme illustrated in FIG. 4 may be implemented at least partially using an NVMe protocol. In such an embodiment, placement identifier 434 may be implemented as a portion of the command 430 (e.g., a directive portion of an NVMe command); M, N, and/or P may be parameters that may be configured, for example, using an NVMe Namespace Management command; the controller 426 may be implemented with one or more. NVMe controllers; and/or the NVM subsystem 412 may be implemented as an NVMe subsystem, an endurance group (which, in some embodiments may be coextensive with a storage device), an NVMe domain, and/or the like, or any combination thereof. In an embodiment implemented at least partially using an NVMe protocol, a directive specific (DSPEC) field may be used to provide a placement identifier (e.g., a reclaim group (which may be indicated by a reclaim group identifier) and a placement handle). A DSPEC field may be used, for example, in an implementation in which a directive type (DTYPE) field may be used to indicate that a flexible data placement feature is used. In such an embodiment, an invalid and/or default (e.g., all zeros) value of a DSPEC field may indicate the absence of a reclaim group indicator and/or placement handle.

In the embodiments of flexible data placement schemes illustrated in FIG. 2, FIG. 3, and/or FIG. 4, a reclaim unit may be implemented (at least from the perspective of a host) as a logical representation of an underlying portion of physical storage media. Thus, the host may be shielded from, and/or not aware of, one or more ongoing operations and/or conditions of the storage device that may adversely affect one or more operations involving a physical implementation of a logical reclaim unit selected by the host.

For example, in the embodiment illustrated in FIG. 4, a host may send a write command 430 with a placement identifier 434 including a reclaim group identifier 415 and a placement handle 416 that may specify a specific reclaim unit 414 for storing data associated with the write command. However, the controller 426 may have implemented the specified reclaim unit 414 with physical storage media (e.g., a nonvolatile memory (NVM) die) that may be busy with a read operation. Thus, the write operation requested by write command 430 may be delayed until the read operation is completed.

Other examples of ongoing operations and/or conditions of the storage device that may be unknown to a host and may adversely affect one or more operations involving a physical implementation of a logical reclaim unit selected by the host may include: NVM die management conflicts; programming operations involving programming data from a write buffer in a controller into a reclaim unit selected by the host; erase operations being conducted by a die containing a reclaim unit selected by the host; garbage collection operations involving a reclaim unit selected by the host; and/or the like. As another example, a reclaim group may not have adequate available space in the reclaim units in the reclaim group (e.g., the available reclaim units in the reclaim group may already contain too much host user data in this NVM), for example, because of losing one or more erase blocks due to end of life and/or error conditions.

Moreover, to the extent a host may gain an awareness of one or more operations of the physical storage media underlying the flexible data placement scheme illustrated in FIG. 4 by observing the behavior (e.g., NVM die programming delays, erasure delays, and/or the like), the host's awareness may be delayed, for example, due to NVM channel delays, controller delay, communication connection delay (e.g., PCIe delay), host central processing unit (CPU) delay and/or the like.

In a flexible data placement scheme in accordance with example embodiments of the disclosure, a storage device to select a reclaim unit and/or reclaim group (e.g., to use for storing data associated with a write request) based on one or more operations and/or conditions of the storage device.

For example, as described above, in some cases (e.g., when a controller 426 receives a write command 430 that does not include a placement handle 416 or includes a placement handle 416 but not a reclaim group identifier 415) a controller 426 may select a reclaim unit 414 and/or reclaim group 418 to use for storing data associated with a write command. In such a case, the controller 426 may base the selection of the reclaim unit 414 and/or reclaim group 418, at least partially, on one or more operations of the storage device that may affect the performance of a write operation associated with the write command. For example, the controller 426 may select a reclaim unit 414 and/or reclaim group 418 that is implemented with physical storage media (e.g., an NVM die) that is not currently busy with a program (e.g., write) operation, a read operation, an erase operation, a garbage collection operation, and/or the like. As another example, the controller 426 may select a reclaim unit 414 and/or reclaim group 418 having a command queue with no or relatively few pending commands. As a further example, a controller may select a reclaim unit 414 and/or reclaim group 418 based on an opportunistic status such as an NVM die that is approaching the completion of a programming cycle, an associated write buffer that is nearing a full word line, and/or an open block timer that is nearing expiration.

Additionally, or alternatively, the controller 426 may base the selection of the reclaim unit 414 and/or reclaim group 418, at least partially, on one or more conditions of the storage device that may affect the performance of a write operation associated with the write command. For example, the controller 426 may avoid selecting a reclaim unit and/or reclaim group in which an NVM die may be exhibiting end-of-life (EOL) behavior such as relatively low operation speed, relatively high bit error accumulation rate, voltage shifts, and/or the like. Additionally, or alternatively, the controller 426 may select a reclaim unit and/or reclaim group in which the physical storage media may exhibit relatively young behavior.

In some embodiments, an operation of a storage device may refer to an ongoing operation such as a read, write, and/or erase operation that is currently being performed, a command queue that currently contains a relatively large number of commands, a write buffer that is currently nearing a full word line, and/or the like. In some embodiments, an ongoing operation may be in contrast to a previous operation such as a previous selection of a reclaim unit based on a round-robin technique or a wear leveling technique. In some embodiments, a wear leveling technique may manage the behavior of the NVM to attempt to equalize (at least approximately equalize) the number of program and/or erase (P/E) cycles on one or more (e.g., each) erase block of the NVM. In some embodiments, one or more modifiers may alter the attempt to equalize the P/E cycles, for example, based on one or more ongoing behaviors and/or conditions of the NVM (e.g., fewer P/E cycles may be performed on an erase block that may already have indications of relatively higher wear.

Figure 5:
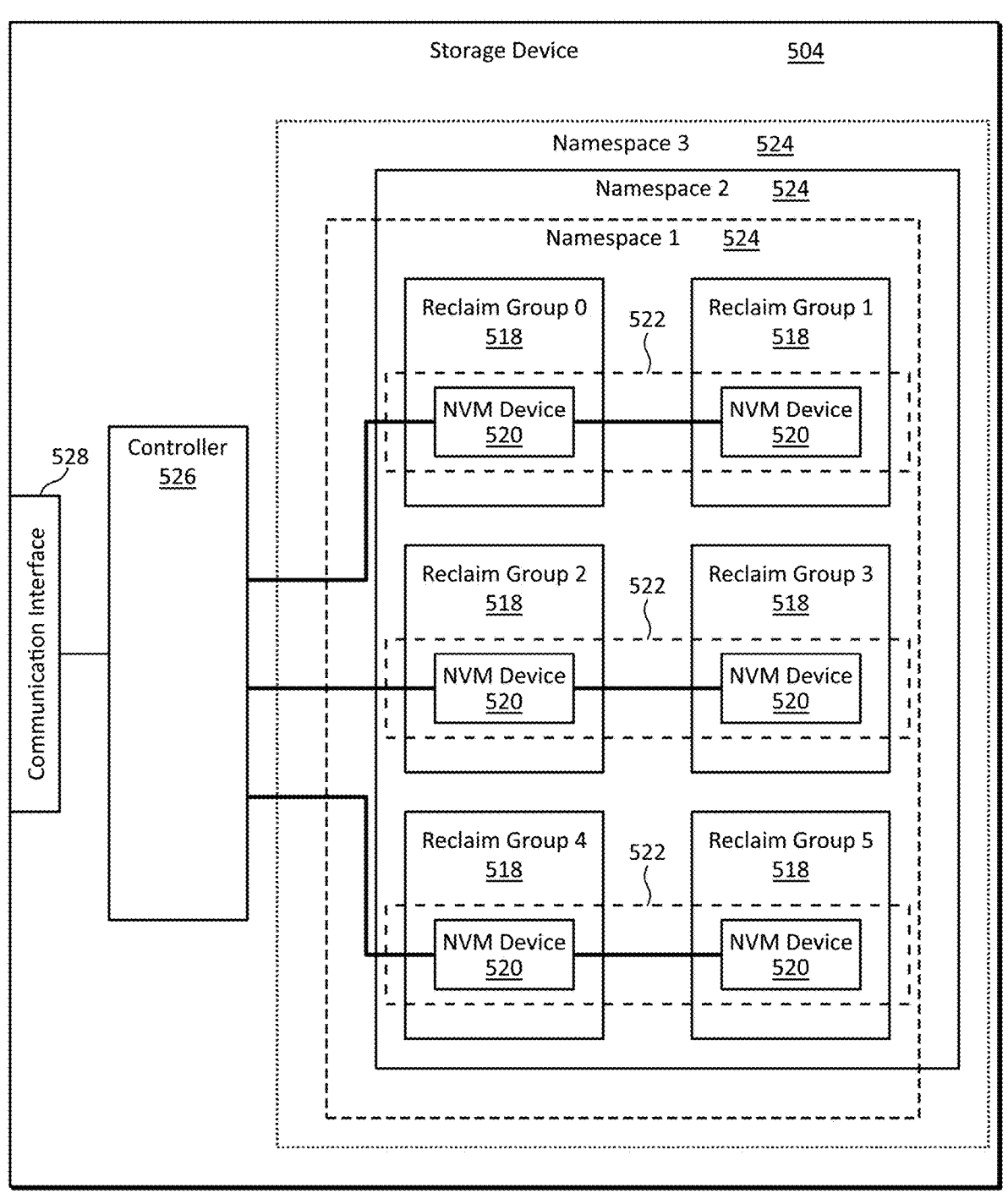
FIG. 5 illustrates another embodiment of a flexible data placement scheme in accordance with example embodiments of the disclosure.

FIG. 5 illustrates another embodiment of a flexible data placement scheme in accordance with example embodiments of the disclosure. In the embodiment illustrated in FIG. 5, a storage device 504 may include storage media implemented with nonvolatile memory devices (e.g., NVM dies) 520 arranged in one or more channels 522. The nonvolatile memory devices 520 may be controlled by a controller 526. The storage device 504 may communicate with a host using a communication interface 528.

The storage device 504 may implement a flexible data placement scheme in which a host may specify a reclaim group and/or reclaim unit to use for storing data associated with a write command sent from the host to the controller 526. In a manner similar to the embodiment illustrated in FIG. 3, one or more reclaim groups 518 may be associated with one or more NVM devices 520 (e.g., each reclaim group 518 may be associated with a corresponding NVM device 520). However, in the embodiment illustrated in FIG. 5, one or more namespaces (e.g., Namespace 1, Namespace 2, and/or Namespace 3) may encompass at least a portion of more than one reclaim group 518. In some embodiments, in addition to namespaces, and/or as an alternative to namespaces, data may be divided and/or arrange data associated with the write command into groups based on logical block addresses (LBAs), one or more applications that may use the data, host write traffic threads, and/or the like, for separating and/or managing data based on reclaim unit handles, reclaim units, erase units, and/or the like.

For example, in some embodiments, a namespace 524 may encompass at least a portion of each reclaim group 518. However one namespace 524 (e.g., Namespace 1) may be separate from other namespaces (e.g., Namespace and/or Namespace 3) based on one or more reclaim units and/or reclaim unit handles. For example, if the embodiment illustrated in FIG. 5 is implemented using the reclaim unit handle scheme illustrated in FIG. 4, one or more reclaim unit handles associated with a second namespace (e.g., a Namespace B) may reference only reclaim units 414 that, may not be referenced by any of the reclaim unit handles 436 associated with Namespace A.

In some embodiments, a reclaim unit handle (e.g., specified by a host) that is specific to a namespace may be resolved by the controller 526 to more than one reclaim unit handle across multiple reclaim groups 518. For example, a reclaim unit handle RUH 0 associated with a namespace NSID 1 may translate to an allowed reclaim unit handle RUH A in reclaim group RG 0, RUH B in RG1, . . . , and/or RUH F in RG5 where RUH A through RUH F may be unique RUH IDs within the storage device 504. In some embodiments, a host may configure the one or more namespaces 524 to have unique reclaim unit handles on one or more (e.g., each) reclaim group 518. Alternatively, or additionally, a host may share one or more reclaim unit handles between two or more namespaces 524.

FIG. 6 illustrates an embodiment of a method for servicing a write command using a flexible data placement scheme in accordance with example embodiments of the disclosure. The method illustrated in FIG. 6 may be implemented, for example, using the storage device 504 illustrated in FIG. 5, however, the inventive principles are not limited to these or any other implementation details.

Referring to FIG. 6, the method may begin at operation 642 where a host may send a write command indicating a reclaim unit handle and a namespace RUH A and NSID 1) to a controller at a storage device. At operation 644, the controller may decode the reclaim unit handle and namespace to an acceptable set of corresponding internally unique reclaim unit handles (e.g., RUH A, RUH B, . . . , RUH F) corresponding to reclaim groups (e.g., RG 0, RG 1 . . . , RG 5, respectively) that may be used to store data associated with the write command. At operation 646, the controller may select a reclaim unit referenced by one of the reclaim unit handles. In some embodiments, the selection may be based on one or more operations and/or conditions of the storage device. At operation 648, the controller may write the data associated with the write command to the selected reclaim unit. At operation 650, the controller may send a completion to the host. In some embodiments, the write operation 648 may be performed as a background task in parallel with operation 650. In some embodiments, in addition to namespaces, and/or as an alternative to namespaces, a host may divide and/or arrange data associated with the write command into groups based on logical block addresses (LBAs), one or more applications that may use the data, host write traffic threads, and/or the like, for separating and/or managing data based on reclaim unit handles, reclaim units, erase units, and/or the like.

Figure 7:
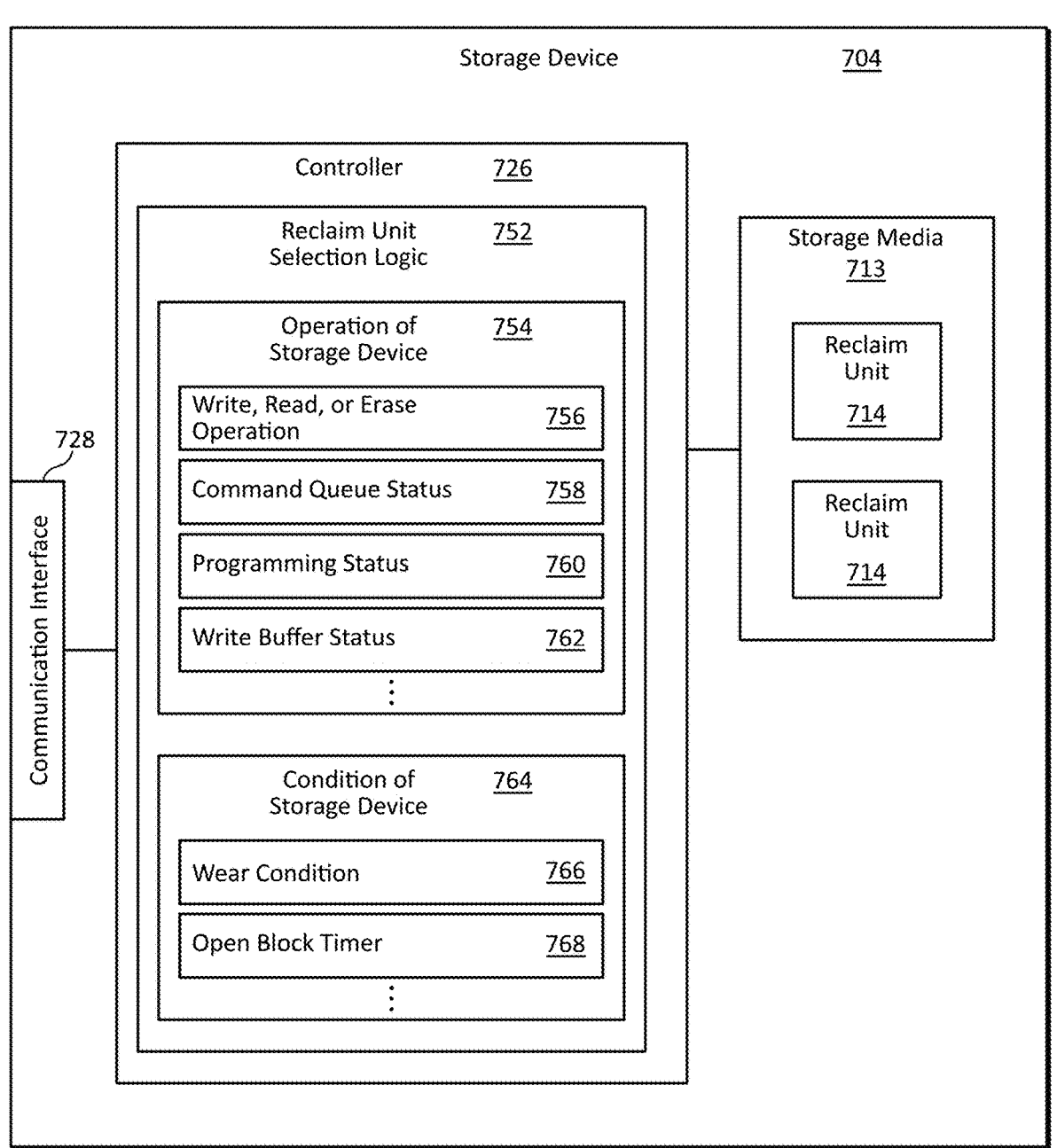
FIG. 7 illustrates an embodiment of a storage device with flexible data placement in accordance with example embodiments of the disclosure.

FIG. 7 illustrates an embodiment of a storage device with flexible data placement in accordance with example embodiments of the disclosure. The storage device 704 illustrated in FIG. 7 may include storage media 713 and a controller 726. The storage media 713 may include two or more reclaim units 714. In some embodiments, some or all of the reclaim units 714 may be arranged in reclaim groups. The controller 726 may include reclaim unit selection logic 752 (which may also be referred to as selection logic) that may select one or more of the reclaim units 714 to be used to store data associated with a write command that may be received, for example, using a communication interface 728.

In some embodiments, the selection logic 752 may select one or more of the reclaim units 714 based, at least in part, on reclaim unit handle that may be indicated by a write command (e.g., using a placement identifier the may include a reclaim group identifier and/or a placement handle). In some embodiments, the selection logic 752 may select one or more of the reclaim units 714 based, at least in part, on an operation and/or condition of the storage device 704 using logic 754 and/or 764.

Logic 754 may include logic that may enable the controller 726 to select one or more of the reclaim units 714 based, at least in part, on an operation of the storage device 704. For example, logic 754 may include one or more of various types of logic including logic 756, 758, 760, 762, and/or the like. Logic 756 may select a reclaim unit 714 based on the current status of a write operation, read operation, erase operation, and/or the like. For example, the logic 756 may select a reclaim unit 714 that may include physical storage media (e.g., an NVM die) that is not currently busy, or may not soon be busy, with a write operation (e.g., a program operation), a read operation, an erase operation, and/or the like.

Logic 758 may select a reclaim unit 714 based on the status of one or more command queues associated with the reclaim unit. For example, the logic 758 may avoid selecting a reclaim unit 714 for which a command queue in the controller 726 has any pending commands (or a relatively large number of commands), for example, because the reclaim unit 714 may not be able to service the write command until its corresponding command queue is cleared.

Logic 760 may select a reclaim unit 714 based on the programming status of physical storage media (e.g., an NVM die) with which the reclaim unit 714 may be implemented. In some embodiments, this may be implemented as an opportunistic determination. For example, logic 760 may select a reclaim unit having physical storage media that is currently being programmed (e.g., written) if the programming segment is nearing completion. Depending on the implementation details, this may enable write data to be programmed into the reclaim unit 714 immediately or shortly after the current programming segment is completed.

Logic 762 may select a reclaim unit 714 based on the status of a write buffer associated with the reclaim unit 714, for example, whether the write buffer is nearing a full word line (e.g. for a specific reclaim group).

Additionally, or alternatively, logic 764 may include logic that may enable the controller 726 to select one or more of the reclaim units 714 based, at least in part, on a condition of the storage device 704. For example, logic 764 may include one or more of various types of logic including logic 766, 768, and/or the like. Logic 766 may select a reclaim unit 714 based on the condition (e.g. wear condition) of physical storage media (e.g., an NVM die) that is used to implement the reclaim unit 714. For example, the logic 766 may observe one or more behaviors of an NVM die to determine if it is approaching end of life (EOL). Behaviors the logic 766 may observe may include program speed, read speed, erase speed, and/or the like, bit error accumulation rate, one or more sense voltage shifts, behaviors as a function of temperature, and/or the like. In some embodiments, the logic 766 may emphasize selecting one or more reclaim units 714 that exhibit relatively young (e.g., low wear) behavior for programming with write data to achieve relatively even wear of different reclaim units, to provide better performance for the write data, and/or the like.

Logic 768 may select a reclaim unit 714 based on the status of an open block timer for physical storage media used to implement the reclaim unit 714. For example, if an open block timer for a reclaim unit 714 is nearing expiration, the logic 768 may preferentially select that reclaim unit to prevent the timer from closing out the block with a lower usage percentage. Depending on the implementation details, this may improve the overall storage media utilization, capacity, and/or the like.

Figure 8:
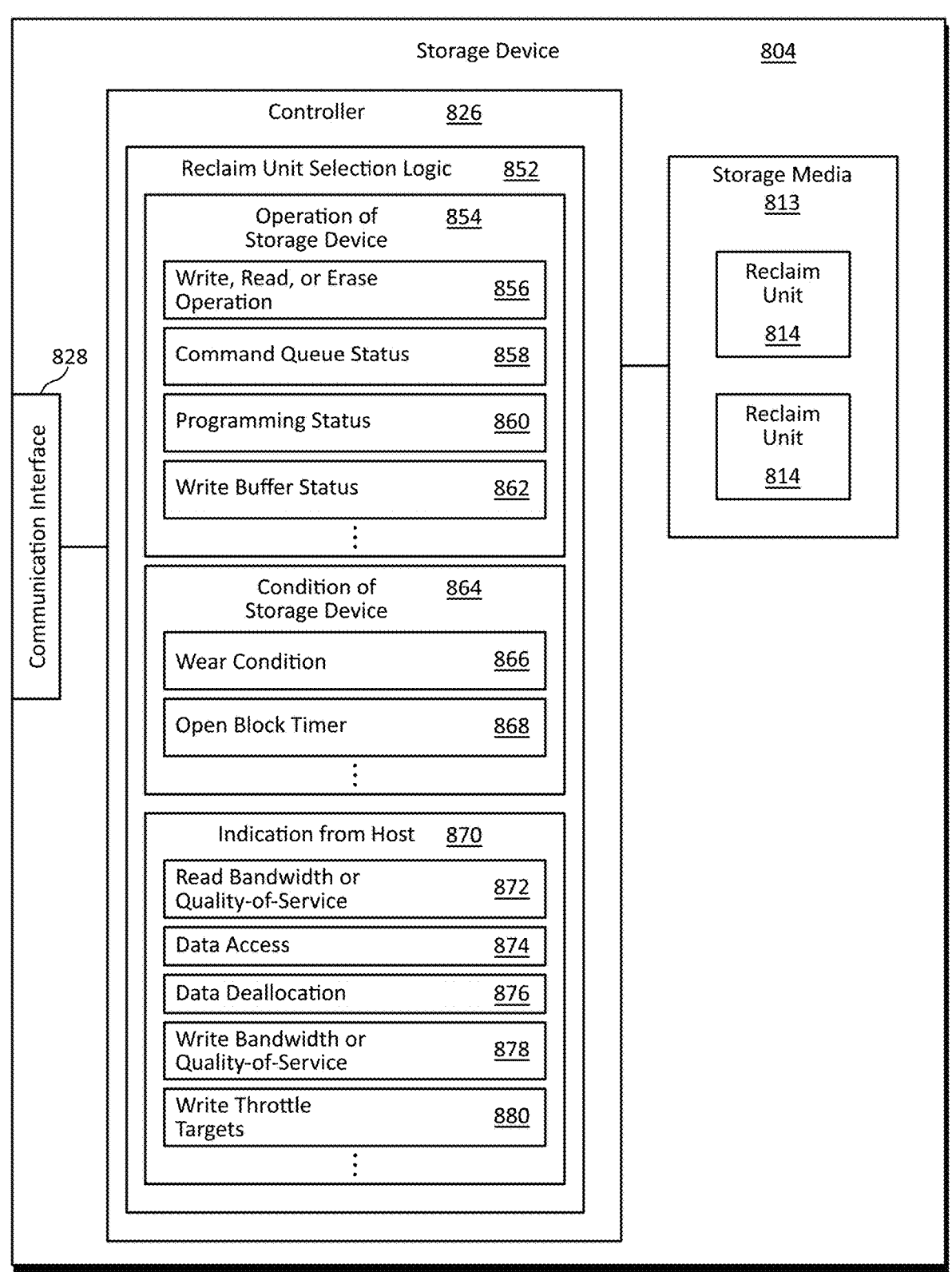
FIG. 8 illustrates another embodiment of a storage device with flexible data placement in accordance with example embodiments of the disclosure.

FIG. 8 illustrates another embodiment of a storage device with flexible data placement in accordance with example embodiments of the disclosure. The storage device 804 illustrated in FIG. 8 may include one or more components that, in some aspects, may be similar to those in the embodiment illustrated in FIG. 7 with similar components indicated with reference numbers ending in the same digits. However, the embodiment illustrated in FIG. 8, may additionally, or alternatively, include logic 870 that may select one or more of the reclaim units 714 based, at least in part, on one or more indications provided by a host. For example, logic 870 may include one or more of various types of logic including logic 872, 874, 876, 878, 880, and/or the like. Logic 872 may select a reclaim unit 814 based on its ability to enhance (e.g., optimize) read QoS and/or read bandwidth for data stored in the reclaim unit 814. For example, logic 872 may select a reclaim unit 814 based on its ability to enhance read QoS by distributing data in write units (e.g., 4 KB write units) across one or more die. As another example, logic 872 may select a reclaim unit 814 based on its ability to enhance read bandwidth by distributing data in word lines (e.g., full word lines) across one or more die.

Logic 874 may select one or more reclaim units 814 based on one or more data access patterns (e.g., whether write data associated with a write command is hot or cold data). For example, relatively cold data may be placed in a reclaim unit 814 having erase blocks (EBs) that may behave as they are relatively old and/or have a high level of wear. In some embodiments, this may be implemented with one or more unique reclaim unit handles being duplicated in a reclaim group. For instance, one reclaim unit handle in a reclaim group may reference an older behaving reclaim unit, and another reclaim unit handle in the reclaim group may reference a younger behaving reclaim unit (e.g., a reclaim unit that may have performed relatively few program and/or erase (P/E) cycles).

Logic 876 may select one or more reclaim units 814 based on one or more data deallocation patterns. For example, data that is likely to be deallocated together may be written to the same reclaim unit and/or reclaim group (e.g., without further spreading of the data).

Logic 878 may select one or more reclaim units 814 to enhance (e.g., optimize) write bandwidth and/or QoS. For example, reclaim units 814 may be selected with one reclaim unit handle per reclaim group to write data in word line (e.g., full word line) units.

Logic 880 may select one or more reclaim units 814 to accommodate one or more write throttle targets. For example, a host may attempt to limit the number of reclaim unit handles on one or more reclaim groups to meet one or more bandwidth limits that may be smaller than the total number of reclaim groups that may be available (e.g., for maximum bandwidth).

Each of the various logic components illustrated in FIG. 7 and FIG. 8 may have independent utility and may be implemented separately without any of the other logic components. Thus, some embodiments may omit one or more of the logic components or include other logic components. In some embodiments, various combinations of the logic components may provide synergistic results.

Figure 9A:
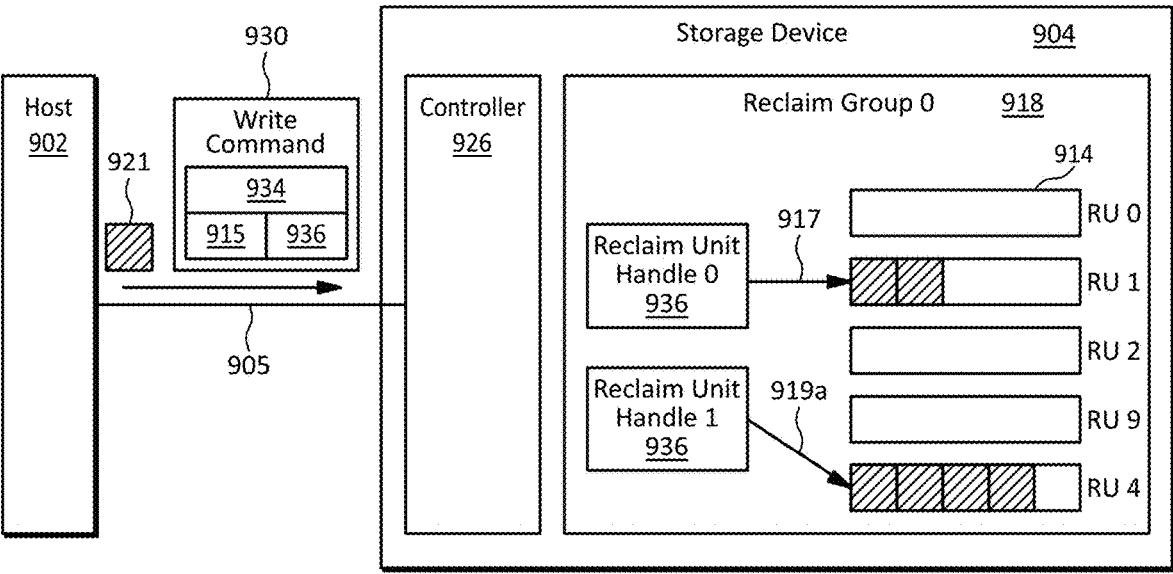
FIG. 9A illustrates an embodiment of a flexible data placement scheme with reference modification in a first data placement state in accordance with example embodiments of the disclosure.
Figure 9B:
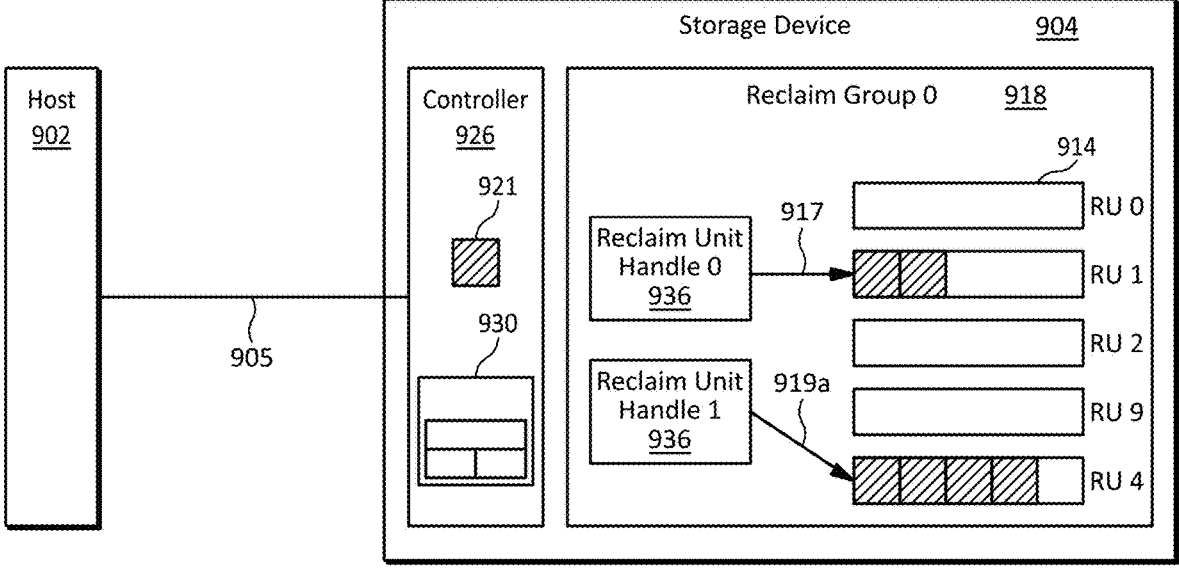
FIG. 9B illustrates the embodiment of the data placement scheme illustrated in FIG. 9A in a second data placement state in accordance with example embodiments of the disclosure.
Figure 9C:
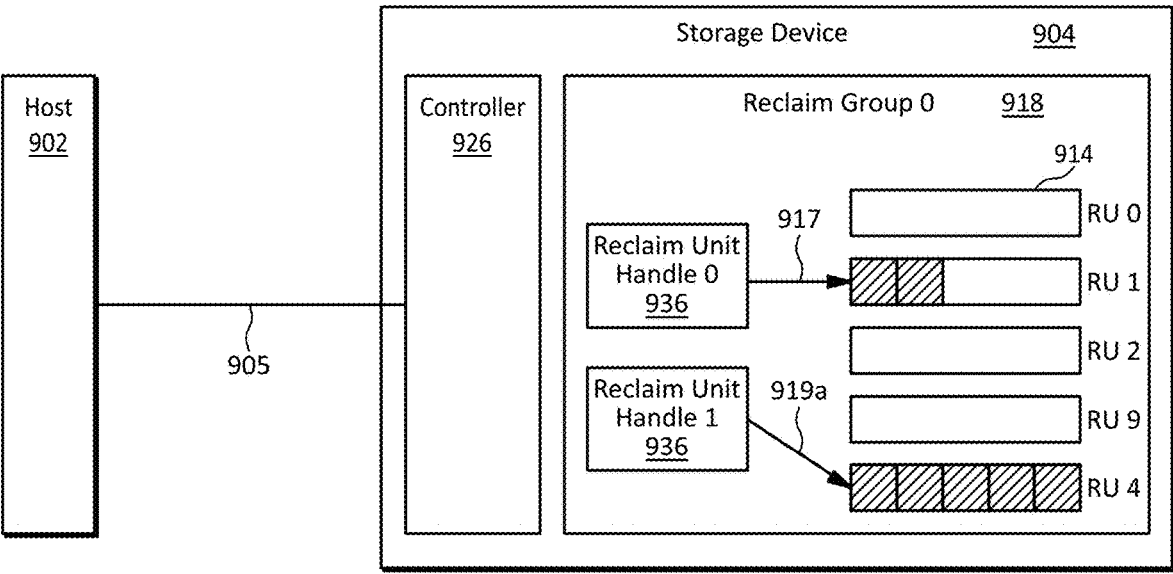
FIG. 9C illustrates the embodiment of the data placement scheme illustrated in FIG. 9A in a third data placement state in accordance with example embodiments of the disclosure.
Figure 9D:
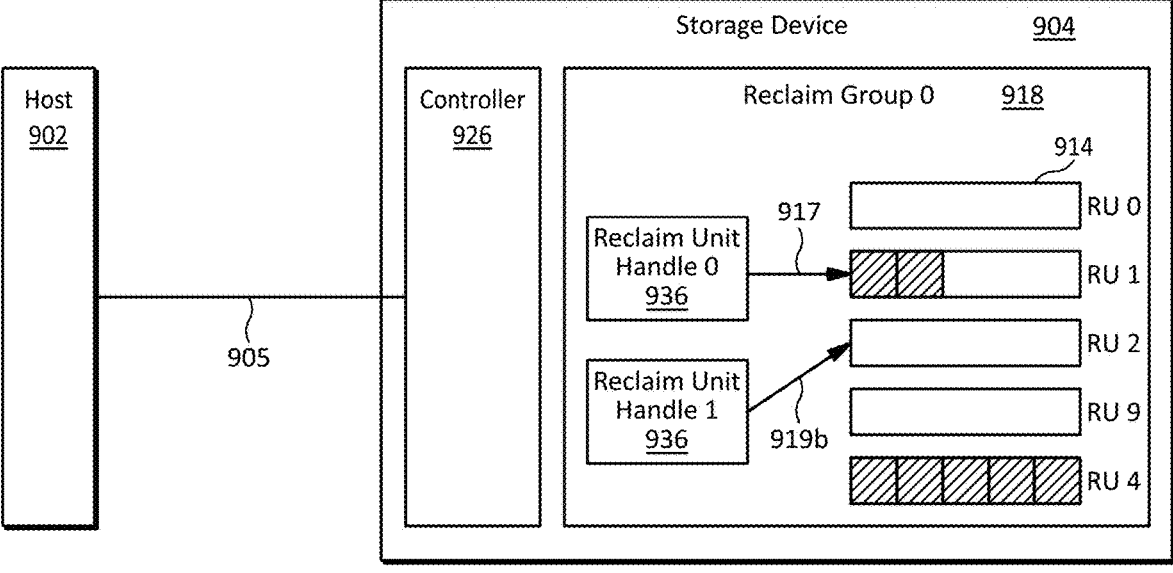
FIG. 9D illustrates the embodiment of the data placement scheme illustrated in FIG. 9A in a fourth data placement state in accordance with example embodiments of the disclosure.

FIG. 9A illustrates an embodiment of a flexible data placement scheme with reference modification in a first data placement state in accordance with example embodiments of the disclosure. FIG. 9B illustrates the embodiment of the data placement scheme illustrated in FIG. 9A in a second data placement state in accordance with example embodiments of the disclosure. FIG. 9C illustrates the embodiment of the data placement scheme illustrated in FIG. 9A in a third data placement state in accordance with example embodiments of the disclosure. FIG. 9D illustrates the embodiment of the data placement scheme illustrated in FIG. 9A in a fourth data placement state in accordance with example embodiments of the disclosure.

FIG. 9A, FIG. 9B, FIG. 9C, and/or FIG. 9D may be referred to collectively and/or individually as FIG. 9.

The embodiment illustrated in FIG. 9 may include a host 902 and a storage device 904 communicating using a communication connection 905. The storage device 904 may include a controller 926 (which may control the overall operation of the storage device 904) and storage media including reclaim units 914 arranged in one or more reclaim groups 918. One reclaim group 918 referred to as Reclaim Group 0 is illustrated in FIG. 9, but the reclaim units 914 may be arranged in any number of reclaim groups 918. For purposes of illustration, in the embodiment illustrated in FIG. 9, Reclaim Group 0 may include five reclaim units 914 identified as RU 0, RU 1, RU 2, RU 3, and RU 4, each of which may have a storage capacity of five pages of data, but any number and/or size of reclaim units may be used. For example, in a practical implementation, a reclaim unit may include one, two, four, or more erase blocks, each of which may have a storage capacity measured in MB or GB and page size measured in KB.

One or more reclaim unit handles 936 may reference corresponding reclaim units 914. For example, as shown in FIG. 9A, a first reclaim unit handle 936 identified as Reclaim Unit Handle 0 (or RUH 0) may reference RU 1 as indicated by arrow 917. A second reclaim unit handle 936 identified as Reclaim Unit Handle 1 (RUH 1) may reference RU 4 as indicated by arrow 919*a*.

Referring to FIG. 9A, the storage device 904 may be shown in an initial state in which two pages of data may be stored in the reclaim unit 914 identified as RU 1, and four pages of data may be stored in the reclaim unit 914 identified as RU 4 as shown by the diagonally shaded portions of RU 1 and RU 4.

The host 902 may send a write command 930 and a page of data 921 (or an address, pointer, or other indicator of a location of the page of data 921) to the storage device 904 using communication connection 905. The command 930 may include a placement identifier 934 that may include a reclaim group identifier 915 and/or reclaim unit handle 936. In the example illustrated in FIG. 9, the reclaim group identifier 915 and reclaim unit handle 936 may instruct the storage device 904 to store the page of data 921 at the reclaim unit 914 referenced by Reclaim Unit Handle 1 in Reclaim Group 0.

In some embodiments, the command 930 and/or the placement identifier 934 may use a different technique to specify a reclaim unit into which the data 921 is to be written. For example, rather than directly provide a reclaim unit handle 936, the command 930 and/or placement identifier 934 may include a placement handle that may specify a reclaim unit handle, for example, as illustrated in the embodiment described with respect to FIG. 4.

Referring to FIG. 9B, the controller 926 may receive the write command 930 and/or page of data 921. Based on the reclaim group identifier 915 and reclaim unit handle 936 in the placement identifier 934 included in the write command 930, the controller 926 may determine that the page of data 921 should be stored in the reclaim unit 914 referenced by Reclaim Unit Handle 1 in Reclaim Group 0. In the example illustrated in FIG. 9B, Reclaim Unit Handle 1 may reference the reclaim unit 914 identifies as RU 4, and thus, the controller 926 may store the page of data 921 in RU 4 as shown in FIG. 9C.

Referring to FIG. 9D, the page of data 921 may have filled the reclaim unit 914 indicated as RU 4 as shown with diagonal shading. Thus, the controller 926 may modify the Reclaim Unit Handle 1 to reference a different (e.g., empty) reclaim unit 914 within Reclaim Group 0 such as RU 2 as shown by arrow 919*b*. The controller 926 may then proceed to fill RU 2 with data received from the host using write commands 930 that specify Reclaim Unit Handle 1 in the placement identifier 934.

Figure 10:
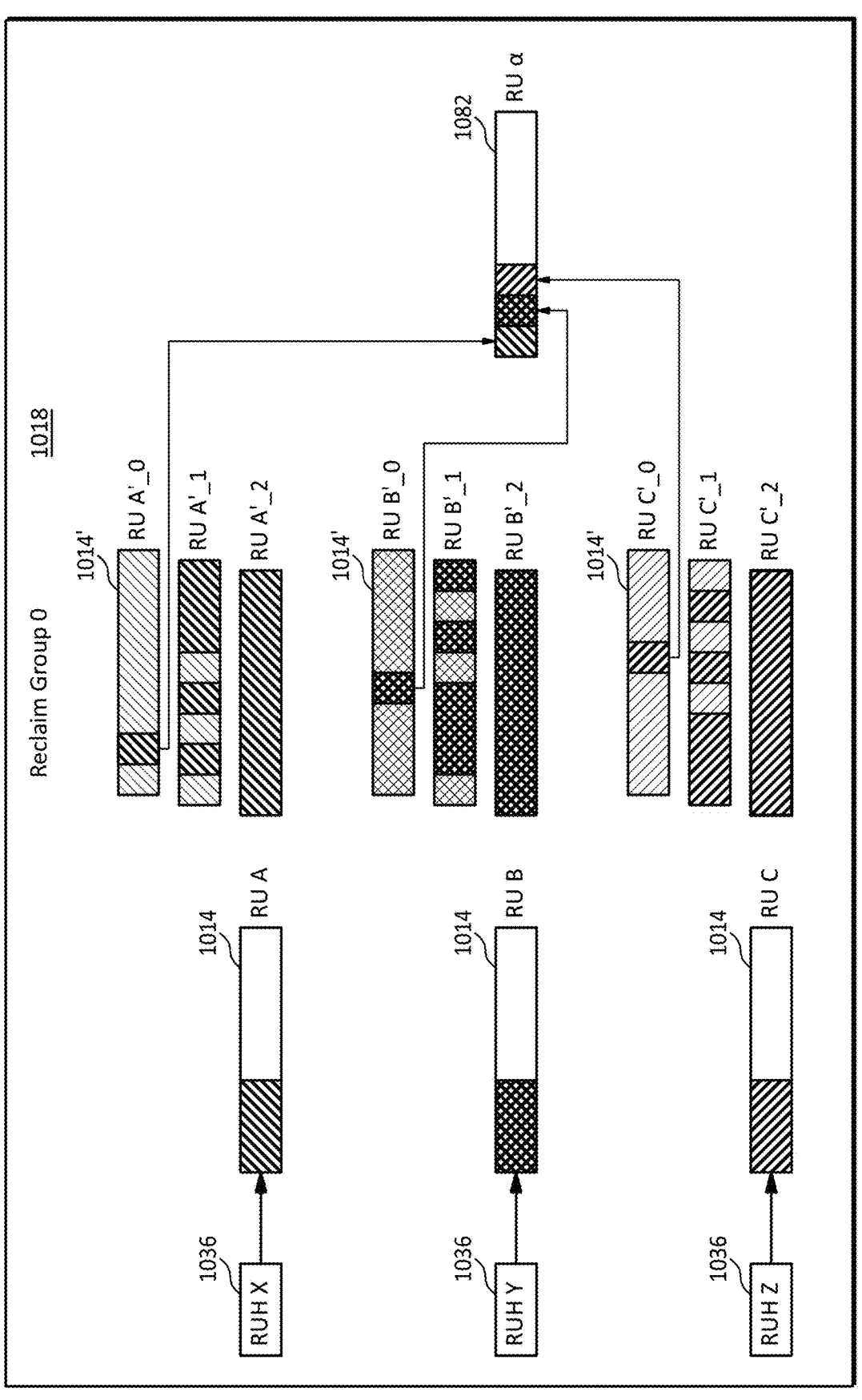
FIG. 10 illustrates an embodiment of an initial isolation scheme for a flexible data placement scheme for a storage device in accordance with example embodiments of the disclosure.

FIG. 10 illustrates an embodiment of an initial isolation scheme for a flexible data placement scheme for a storage device in accordance with example embodiments of the disclosure. The embodiment illustrated in FIG. 10 may include three reclaim unit handles 1036 identified as RUH X, RUH Y, and RUH Z.

The reclaim unit handle RUH X may currently reference a reclaim unit 1014 identified as RU A. The reclaim unit RU A may be partially filled with data as shown with single diagonal shading with lines running from top right to bottom left. The reclaim unit handle RUH X may have previously referenced reclaim units 1014' identified as RU A'_0, RU A'_1, and RU A'_2. The previously referenced reclaim units 1014' may have been filled with data (as shown with single diagonal shading with lines running from top right to bottom left), for example, when they were referenced by RUH X in a manner similar to the way the reclaim unit 314 identified as RU 4 was filled with data when it was referenced by Reclaim Unit Handle 1 (RUH 1) as illustrated in FIG. 3B and FIG. 3C. Although not currently referenced by RUH X, the previously referenced reclaim units RU A'_0, RU A'_1, and RU A'_2 may still remain associated with RUH X, for example, by using a data structure such as a reclaim unit association table.

The reclaim unit handle RUH Y may currently reference a reclaim unit 1014 identified as RU B. The reclaim unit RU B may be partially filled with data as shown with diagonal cross shading. The reclaim unit handle RUH Y may have previously referenced reclaim units 1014' identified as RU B'_0, RU B'_1 and RU B'_2. The previously referenced reclaim units 1014' may have been filled with data (as shown with diagonal cross shading), for example, when they were referenced by RUH Y.

Likewise, the reclaim unit handle RUH Z may currently reference a reclaim unit 1014 identified as RU C. The reclaim unit RU C may be partially filled with data as shown with single diagonal shading with lines running from top left to bottom right. The reclaim unit handle RUH Z may have previously referenced reclaim units 1014' identified as RU C'_0, RU C'_1, and RU C'_2. The previously referenced reclaim units 1014' may have been filled with data (as shown with single diagonal shading with lines running from top left to bottom right), for example, when they were referenced by RUH Z.

In some embodiments, a controller within a storage device may perform one or more operations (e.g., maintenance operations) on data stored in previously referenced reclaim units 1014'. For example, some or all of the data stored in the previously referenced reclaim units 1014' may be deallocated (e.g., by a host), thereby resulting in unused storage capacity in the previously referenced reclaim units 1014'. This is illustrated in FIG. 10 in which the portions of the previously referenced reclaim units 1014' containing deallocated (e.g., invalid) data are shown with shading having relatively thinner lines.

In some embodiments, a controller may perform one or more maintenance operations to enable the unused storage capacity in the previously referenced reclaim units 1014' to be erased, reused, repurposed, and/or the like. For example, a controller may perform a garbage collection operation in which valid data (e.g., data that has not been deallocated) in one or more of the previously referenced reclaim units 1014' may be copied to a different reclaim unit so the one or more of the previously referenced reclaim units 1014' may be erased and reused.

The embodiment illustrated in FIG. 10 may implement an initial isolation scheme in which data written to reclaim units that are currently, or were previously, referenced by different reclaim unit handles 1036 may be initially isolated from each other. (In some embodiments, data may be considered isolated if the reclaim unit in which it is stored only includes data that was written to the reclaim unit using the same reclaim unit handle.) Thus, reclaim units RU A, RU A'_0, RU A'_1, and RU A'_2 may only include data that was written when these reclaim units were referenced by RUH X. Similarly, reclaim units RU B, RU B'_0, RU B'_1, and RU B'_2 may only include data that was written when these reclaim units were referenced by RUH Y, and reclaim units RU C, RU C'_0, RU C'_1, and RU C'_2 may only include data that was written when these reclaim units were referenced by RUH Z.

However, as part of a controller operation, data from reclaim units that were written using different reclaim unit handles may be combined in a single reclaim unit. This is illustrated in FIG. 10 in which a controller may read valid data from previously referenced reclaim units RU A'_0, RU B'_0, and RU C'_0 and write them to a reclaim unit 1082 identified as RU α. Because the valid data copied from the previously referenced reclaim units RU A'_0, RU B'_0, and RU C'_0 may be the last remaining valid data in one or more of these reclaim units, one or more of the reclaim units RU A'_0, RU B'_0, and/or RU C'_0 may be erased, e.g., as part of a garbage collection operation to be reused for storing other data. A reclaim unit that has been erased (e.g., garbage collected) may be removed from a reclaim unit association table that it may have been listed in.

In some embodiments, the isolation scheme illustrated in FIG. 10 may be referred to as an initial isolation scheme because data written using different reclaim unit handles 1036 may be initially isolated in different reclaim units, but may eventually be combined, for example, by a subsequent operation such as a garbage collection operation, a media management operation (e.g., refresh program, read disturb), and/or the like. In some embodiments, the isolation scheme illustrated in FIG. 10 may be referred to as a host isolation scheme because the host may determine (e.g., using reclaim unit handles) the placement of data in isolated reclaim units.

TABLE 1

| Reclaim Unit Association Table | | |
| --- | --- | --- |
| Reclaim Unit Handle X | Reclaim Unit Handle Y | Reclaim Unit Handle Z |
| RU A'_0 | RU B'_0 | RU C'_0 |
| RU A'_1 | RU B'_1 | RU C'_1 |
| RU A'_2 | RU B'_2 | RU C'_2 |
| . . . | . . . | . . . |

Although one reclaim group 1018 is illustrated in FIG. 10, the reclaim units 1014 may be arranged in any number of reclaim groups. In some embodiments, data from reclaim units in different reclaim groups (e.g., valid data from previously referenced reclaim units in different reclaim groups) may be combined in the same reclaim unit.

Figure 11:
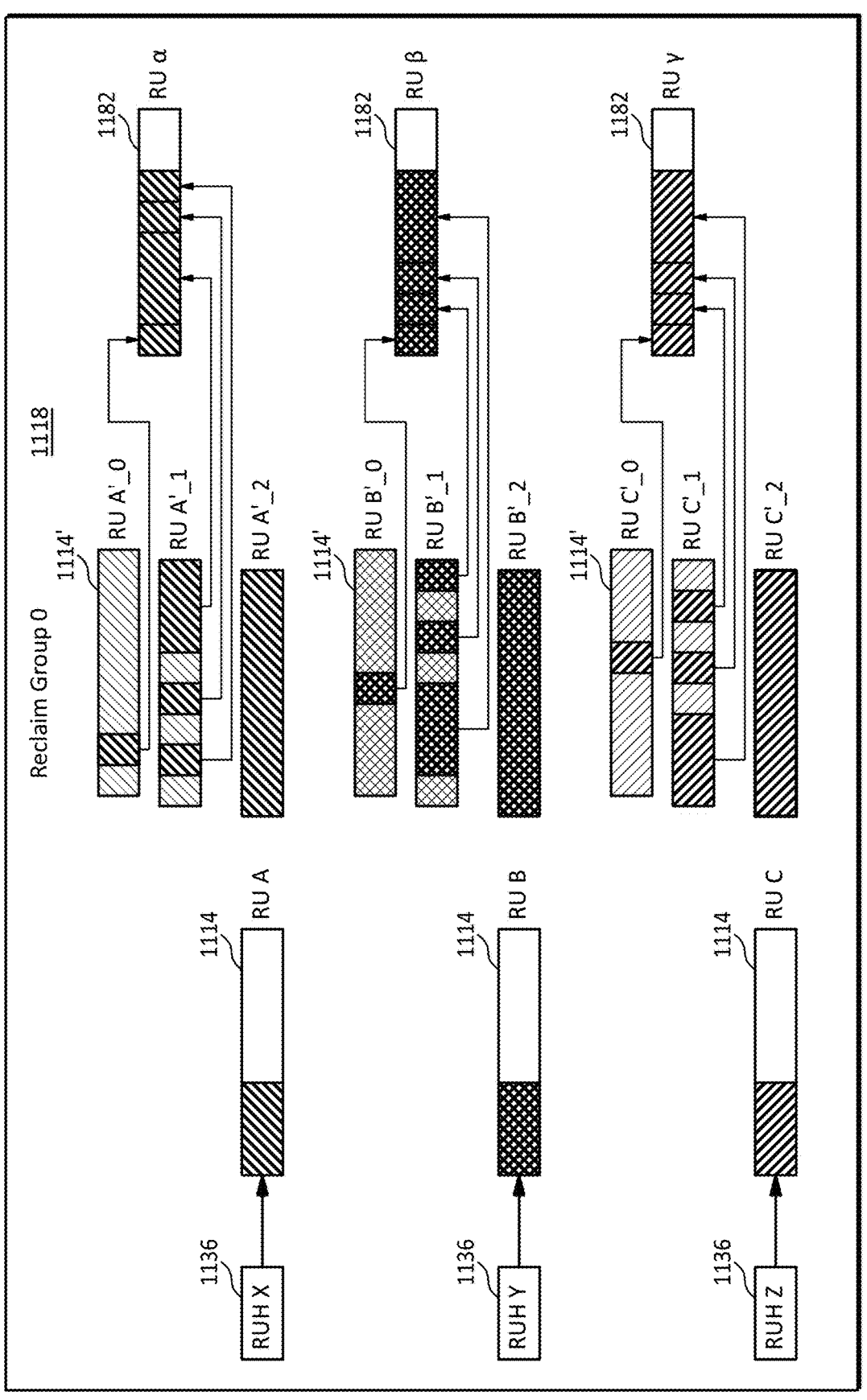
FIG. 11 illustrates an embodiment of a persistent isolation scheme for a flexible data placement scheme for a storage device in accordance with example embodiments of the disclosure.

FIG. 11 illustrates an embodiment of a persistent isolation scheme for a flexible data placement scheme for a storage device in accordance with example embodiments of the disclosure. The embodiment illustrated in FIG. 11 may include three reclaim unit handles 1136 identified as RUH X, RUH Y, and RUH Z that may be used to write data to currently referenced reclaim units 1114 and/or previously referenced reclaim units 1114' in a manner similar to that described above with respect to FIG. 10.

However, the isolation scheme illustrated in FIG. 11 may involve more isolation of data that was written using different reclaim unit handles compared to the embodiment described above with respect to FIG. 10. For example, in the embodiment illustrated in FIG. 11, in a controller operation that may move data from previously referenced reclaim units 1114', data that was written using different reclaim unit handles may not be combined in a single reclaim unit. This is illustrated in FIG. 11 in which a controller may read valid data from (e.g., only from previously referenced reclaim units RU A'_0, RU A'_1, and/or RU A'_2 which were written using the same reclaim unit handle RUH X and write it to a reclaim unit 1182 identified as RU α. However, in some embodiments, reclaim unit RU α may not receive data from reclaim units that were written using other reclaim handles such as RUH Y and/or RUH Z.

Similarly, a controller may read valid data from (e.g., only from) previously referenced reclaim units RU B'_0, RU B'_1, and/or RU B'_2 which were written using the same reclaim unit handle RUH Y and write it to a reclaim unit 1182 identified as RU β. A controller may also read valid data from (e.g., only from) previously referenced reclaim units RU C'_0, RU C'_1, and/or RU C'_2 which were written using the same reclaim unit handle RUH Z and write it to a reclaim unit 1182 identified as RU γ. Thus, in some embodiments, data written to one or more of the reclaim units 1182 may be read from (e.g., only read from) one or more reclaim units that were written using the same reclaim unit handle.

If the valid data read from any of the previously referenced reclaim units 1114' was the last remaining valid data in the reclaim unit, the reclaim unit may be erased, e.g., as part of a garbage collection operation to be reused for storing other data.

In some embodiments, the isolation scheme illustrated in FIG. 11 may be referred to as a persistent isolation scheme because the isolation between data written using different reclaim unit handles may continue beyond the writing and/or deallocating operations, for example, to include one or more garbage collection and/or other controller operations. In some embodiments, the isolation scheme illustrated in FIG. 11 may be referred to as a fully or totally isolated scheme because the isolation between data written using different reclaim unit handles may continue throughout the lifecycle of the data in a storage device.

Although one reclaim group 1118 may be illustrated in FIG. 11, the reclaim units 1114 may be arranged in any number of reclaim groups. In some embodiments, data from reclaim units in different reclaim groups (e.g., valid data from previously referenced reclaim units in different reclaim groups) may be combined in the same reclaim unit.

As stated above, a storage device in accordance with example embodiments of the disclosure may perform a data operation based on a request other than a write command. For example, a storage device may receive a request for a sanitize operation. The request may be associated with an indication relating to data locality in storage media (e.g., a reclaim unit handle, a reclaim group, and/or the like). In some embodiments, the storage device may perform the requested data operation in a manner that may be affected by one or more operations and/or conditions of the storage device. For example, the storage device may adjust the timing, order, and/or the like, of a requested sanitize operation to accommodate a busy reclaim unit, avoid a reclaim unit that may have a relatively small number of effectively estimated P/E cycles remaining in its expected lifetime, and/or the like.

In some example embodiments, a storage device may receive a request for a sanitize operation (e.g. a sanitize command) that may include an indication of two or more reclaim units. (e.g., at least one placement identifier, reclaim group identifier, placement handle, reclaim unit handle identifier, reclaim unit handle, reclaim group, and/or the like). For purposes of illustration, in an example embodiment, the storage device may receive a sanitize command that may identify two reclaim groups (RG 0 and RC; 1) and three reclaim unit handles (RUH 0, RUH 1, and RUH 3) in each of RG 0 and RG 1. Thus, the sanitize command may request a sanitize operation on six reclaim units.

In the absence of an operation on ongoing any of the six reclaim units when the storage device receives the sanitize command (e.g., none of the six reclaim units is busy), the storage device may execute the sanitize command by sanitizing all six reclaim units in parallel, by sanitizing each of the six reclaim units sequentially (e.g., one reclaim unit at a time), by sanitizing each of the three reclaim units in each reclaim group sequentially but both reclaim groups in parallel (e.g., two reclaim units at a time), or in any other manner that may not depend on an ongoing operation and/or condition of any of the six reclaim units.

If, however, one or more of the six reclaim units is busy with an ongoing operation a read, write, erase, garbage collection, and/or the like), the storage device may change the timing, order, and/or the like, of the sanitize operations, to allow the one or more busy reclaim units to complete the ongoing operation. For example, if, in the absence of a busy reclaim unit, the storage device would sanitize all reclaim units in parallel, and RUH 3 in RG 1 is busy with an ongoing erase operation when the storage device receives the sanitize command, the storage device may delay the sanitize operation on the reclaim units in RG 1 to enable the erase operation to be completed.

Figure 12A:
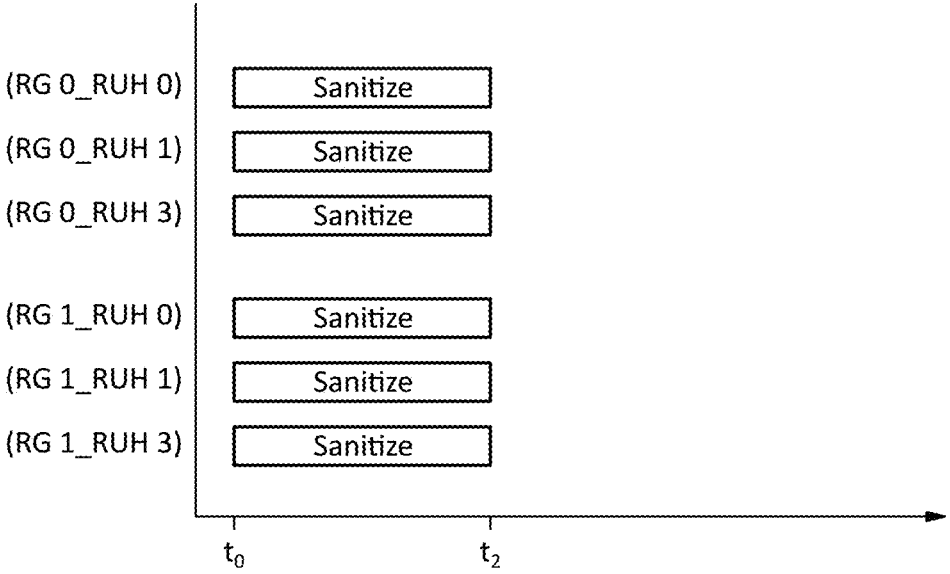
FIG. 12A illustrates a first example embodiment of a sanitize command execution for a flexible data placement scheme in accordance with example embodiments of the disclosure.

FIG. 12A illustrates a first example embodiment of a sanitize command execution for a flexible data placement scheme in accordance with example embodiments of the disclosure. In the embodiment illustrated in FIG. 12A, time may progress from left to right. Reclaim units (RG 0_RUH 0), (RG 0_RUH 1), and (RG 0_RUH 3) may indicate reclaim units referenced by RUH 0, RUH 1, and RUH 3, respectively, in RG 0, and reclaim units (RG 1_RUH 0), (RG 1_RUH 1), and (RG 1_RUH 3) may indicate reclaim units referenced by RUH 0, RUH 1, and RUH 3, respectively, in RG 1. In the embodiment illustrated in FIG. 12A, reclaim groups RG 0 and RG 1 may be implemented with separate NVM dies, but other arrangements may be used.

In the embodiment illustrated in FIG. 12A, there may be no ongoing operations being performed on any of the reclaim units at time $t_0$ when a storage device receives a sanitize command requesting a sanitize operation on six reclaim units. Thus, the storage device may sanitize all size reclaim units in a parallel until time $t_2$.

Figure 12B:
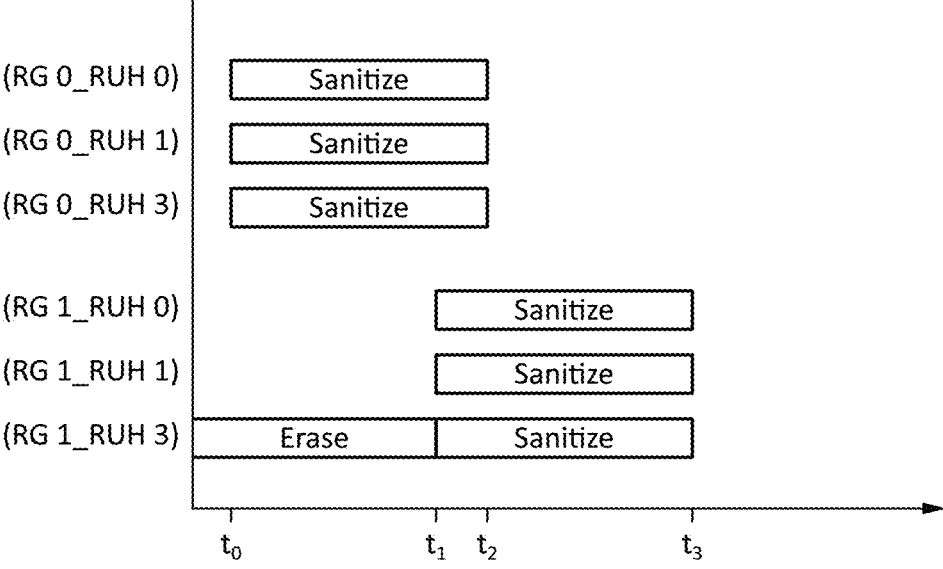
FIG. 12B illustrates a second example embodiment of a sanitize command execution for a flexible data placement scheme in accordance with example embodiments of the disclosure.

FIG. 12B illustrates a second example embodiment of a sanitize command execution for a flexible data placement scheme in accordance with example embodiments of the disclosure. The embodiment illustrated in FIG. 12B may be implemented with a storage device similar to that illustrated in FIG. 12A, however, the reclaim unit (RG 0_RUH 3) may be undergoing a read operation at time t0 when the storage device receives a sanitize command requesting a sanitize operation on six reclaim units. Thus, the storage device may delay the sanitize operation on the reclaim units in RG 1 until time $t_1$ to enable the read operation on (RG 0_RUH 3) to be continue. In parallel with the read operation on (RG 0_RUH 3), the storage device may perform a sanitize operation on (RG 1_RUH 0), (RG 1_RUH 1), and (RG 1_RUH 3) which may be completed at time $t_2$.

At time $t_1$, the read operation on (RG 0_RUH 3) may be completed, and the storage device may begin a sanitize operation on (RG 0_RUH 0), (RG 0_RUH 1), and (RG 0_RUH 3) which may be completed at time $t_3$.

Figure 13A:
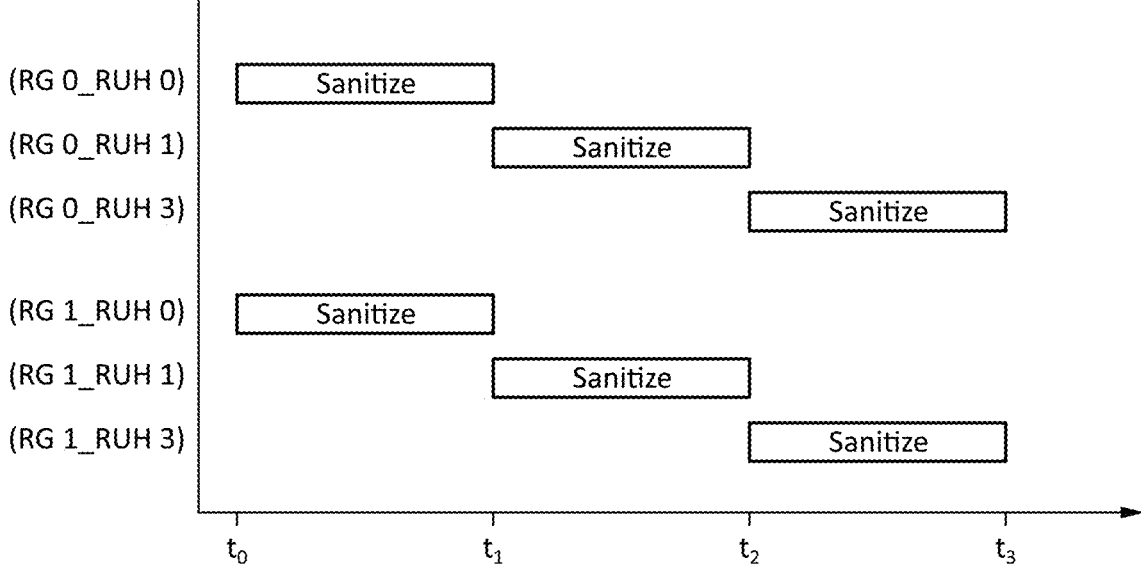
FIG. 13A illustrates a third example embodiment of a sanitize command execution for a flexible data placement scheme in accordance with example embodiments of the disclosure.

FIG. 13A illustrates a third example embodiment of a sanitize command execution for a flexible data placement scheme in accordance with example embodiments of the disclosure. The embodiment illustrated in FIG. 13A may be implemented with a storage device similar to that illustrated in FIG. 12A, however, in embodiment illustrated in FIG. 13A, in the in the absence of any ongoing operations being performed on any of the reclaim units at time $t_0$ when a storage device receives a sanitize command requesting a sanitize operation on the six reclaim units, the storage device may sanitize each of the three reclaim units in each reclaim group sequentially but both reclaim groups in parallel (e.g., two reclaim units at a time). Thus, the storage device may sanitize (RG 0_RUH 0) and (RG 1_RUH 0) in parallel between times $t_0$ and $t_1$, (RG 0_RUH 1) and (RG 1_RUH 1) in parallel between times $t_1$ and $t_2$, and (RG 0_RUH 3) and (RG 1_RUH 3) in parallel between times $t_2$ and $t_3$.

Figure 13B:
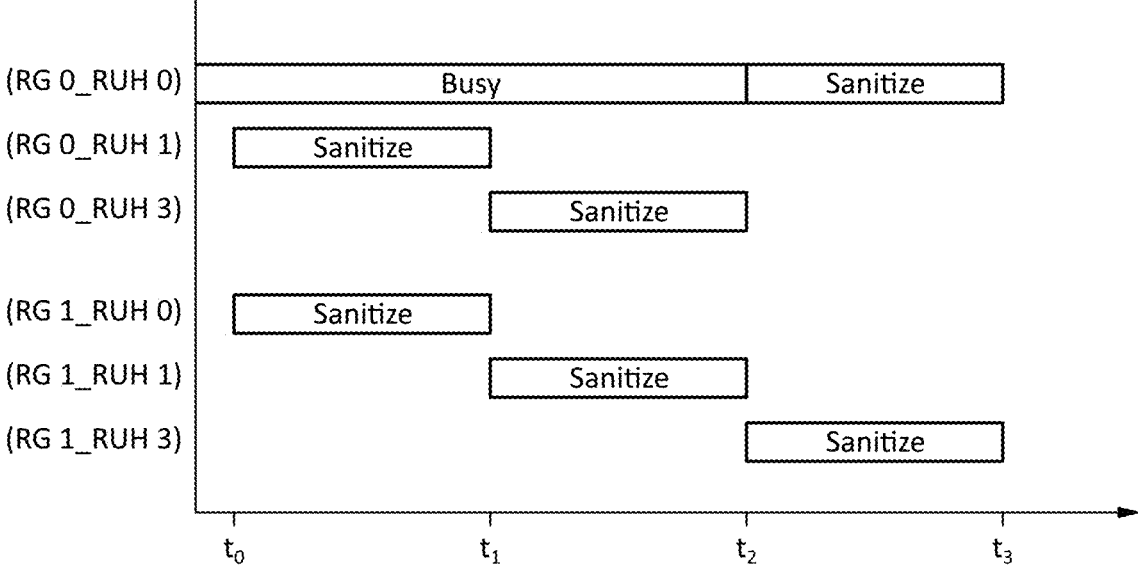
FIG. 13B illustrates a fourth example embodiment of a sanitize command execution for a flexible data placement scheme in accordance with example embodiments of the disclosure.

FIG. 13B illustrates a fourth example embodiment of a sanitize command execution for a flexible data placement scheme in accordance with example embodiments of the disclosure. The embodiment illustrated in FIG. 13B may be implemented with a storage device similar to that illustrated in FIG. 13A, however, the reclaim unit (RG 0_RUH 0) may be busy with an ongoing operation at time $t_0$ when the storage device receives a sanitize command requesting a sanitize operation on six reclaim units. Thus, the storage device may reorder the sanitize operations to enable the ongoing operation on (RG 0_RUH 0) to be completed at time $t_2$ before (RG 0_RUH 0) is sanitized. Specifically, the storage device may sanitize (RG 0_RUH 1) between times $t_0$ and $t_1$, (RG 0_RUH 3) between times $t_1$ and $t_2$, and (RG 0_RUH 0) between times $t_2$ and $t_3$.

Some embodiments of a storage device implementing a flexible data placement scheme in accordance with example embodiments of the disclosure may implement a sanitize command that may be associated with an indication of one or more reclaim groups and/or one or more reclaim unit handles. The sanitize command may perform a sanitize operation on one or more reclaim units (e.g., a portion of storage media in a storage drive) in one or more reclaim groups and/or indicated by the one or more reclaim unit handles. In some embodiments, the sanitize operation may involve erasing the one or more reclaim units. In some embodiments, the sanitize operation may further involve rewriting at least a portion of the one or more reclaim units with data such as zeros, random data, scrambled data, and/or the like.

In some embodiments, a sanitize command may be accompanied by a list of one or more LBAs, whereas in some other embodiments, a sanitize command may not be accompanied by an LBA list.

In some embodiments in which a sanitize command may be accompanied by an indication of one or more reclaim groups and/or one or more reclaim unit handles but not an LBA list, a storage device may perform a sanitize operation on one or more reclaim units (e.g., a portion of storage media in a storage drive) in the one or more reclaim groups and/or indicated by the one or more reclaim unit handles, for example, by erasing the one or more reclaim units. In some embodiments, the storage device may further rewrite at least a portion of the one or more reclaim units with data such as zeros, random data, scrambled data, and/or the like. If the sanitize command is used with an initially isolated type of reclaim unit handle, the storage device may perform a sanitize operation on one or more reclaim units only one or more reclaim units) that may currently be referenced by the reclaim unit handle. If the sanitize command is used with a persistently isolated type of reclaim unit handle, the storage device may perform a sanitize operation only on one or more reclaim units that may currently be, and/or have previously been, referenced by the reclaim unit handle.

Alternatively, or additionally, in some embodiments in which a sanitize command may not be accompanied by an LBA list, a storage device may be provided with an indication of one or more reclaim groups but not a reclaim unit handle. In such embodiments, the storage device may perform a sanitize operation on the one or more reclaim groups (e.g., on the one or more entire reclaim groups).

In some embodiments in which a sanitize command may be accompanied by a list of one or more LBAs, as well as one or more reclaim groups and/or one or more reclaim unit handles, a storage device may perform a check (e.g., an error check) based on the LBA list and one or more reclaim groups and/or one or more reclaim unit handles. For example, the storage device may determine if one or more LBAs on the list are the only LB As in the one or more reclaim groups and/or one or more reclaim unit indicated by the one or more reclaim unit handles prior to executing a sanitize operation.

In some embodiments, if the one or more reclaim groups and/or one or more reclaim unit handles include one or more LBAs that are not in the list of LBAs, the storage device may not perform the sanitize operation, or may perform the sanitize operation on one or more reclaim units that are in the list of LBAs and also in the one or more reclaim groups and/or indicated by the one or more reclaim unit, handles. In some embodiments, if the storage device does not perform the sanitize operation on at least a portion of the reclaim units in the indicated reclaim groups and/or indicated by the one or more reclaim unit handles, the storage device may complete the sanitize command with an error.

In some embodiments in which a sanitize command may be accompanied by a list of one or more LBAs, if the sanitize command is used with an initially isolated type of reclaim unit handle, the storage device may perform a check on a reclaim unit (e.g., only a reclaim unit) that may currently be referenced by an RUH associated with a sanitize command.

In some embodiments in which a sanitize command may be accompanied by a list of one or more LBAs, if the sanitize command is used with a persistently isolated type of reclaim unit handle, the storage device may perform a check on one or more reclaim units that may currently be, and/or have previously been, referenced by an reclaim unit handle associated with a sanitize command.

Alternatively, or additionally, in some embodiments in which a sanitize command may be accompanied by an LBA list and an indication of one or more reclaim groups and/or one or more reclaim unit handles, if a storage device determines that one or more reclaim units in the one or more reclaim groups and/or indicated by the one or more reclaim unit handles is or are not in the LBA list, the storage device may move or copy the LBAs that are not in the LBA list (e.g., to a different reclaim unit) before performing the sanitize operation. In some such embodiments, the storage device may move or copy the LBAs that are not in the LBA list regardless of whether the LBAs that are not on the list are located in reclaim units that are currently referenced by an associated reclaim unit handle (e.g., for initially isolated and/or persistently isolated types of reclaim unit handles) or were previously referenced by an associated reclaim unit handle (e.g., for persistently isolated types of reclaim unit handles).

Alternatively, or additionally, some embodiments may adjust the timing, order, and/or the like, of a requested sanitize operation to accommodate one or more reclaim units that may be in condition with relatively low or high wear that may take more or less time to sanitize.

Figure 14:
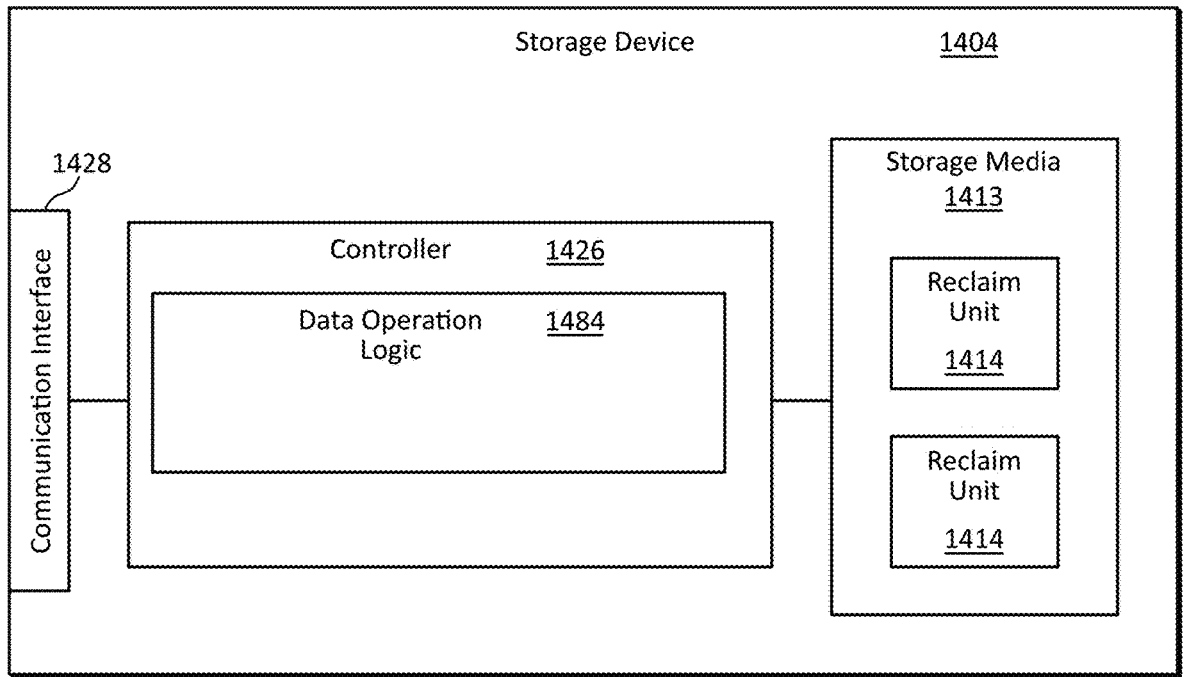
FIG. 14 illustrates another embodiment of a storage device with flexible data placement in accordance with example embodiments of the disclosure.

FIG. 14 illustrates another embodiment of a storage device with flexible data placement in accordance with example embodiments of the disclosure. The storage device 1404 illustrated in FIG. 14 may include storage media 1413 and a controller 1426. The storage media 1413 may include two or more reclaim units 1414, In some embodiments, some or all of the reclaim units 1414 may be arranged in reclaim groups. The controller 1426 may include data operation logic 1484 that may receive any type of data operation request such as a request for a write operation (e.g., a write command, write zeros, write ones, write uncorrectable, and/or the like), a copy operation, a deallocate operation (e.g., an unmap, a trim, and/or the like), a sanitize operation, an erase operation, a format operation, a compare and write operation, and/or the like. The data operation logic 1484 may receive the data operation request, for example, using a communication interface 1428.

In some embodiments, the data operation request may include an indication relating to data locality in storage media such as a reclaim unit handle, a reclaim group, and/or the like. Based on receiving a data operation request with an indication relating to data locality in storage media, the data operation logic 1484 may perform a corresponding data operation, for example, on one or more of the reclaim units 1414, based on one or more operations and/or conditions of the storage device. For example, the data operation logic 1484 may receive a sanitize command and perform a sanitize operation on one or more of the reclaim units 1414 as described above with reference to FIG. 12A, FIG. 12B, FIG. 13A and/or FIG. 13B.

Any of the storage devices, storage media, and/or the like, disclosed herein may be implemented with any type of nonvolatile storage media based on solid state media, magnetic media, optical media, and/or the like. For example, in some embodiments, a computational storage device may be implemented as an SSD based on not-AND (NAND) flash memory, persistent memory such as cross-gridded nonvolatile memory, memory with bulk resistance change, phase change memory (PCM), and/or the like, or any combination thereof.

Any of the storage devices disclosed herein may be implemented in any form factor such as 3.5 inch, 2.5 inch, 1.8 inch, M.2, Enterprise and Data Center Standard Form Factor (EDSTF), NF1, and/or the like, using any connector configuration such as Serial ATA (SATA), Small Computer System Interface (SCSI), Serial Attached SCSI (SAS), U.2, and/or the like.

Any of the storage devices disclosed herein may be implemented entirely or partially with, and/or used in connection with, a server chassis, server rack, dataroom, datacenter, edge datacenter, mobile edge datacenter, and/or any combinations thereof.

Any of the hosts disclosed herein may be implemented with any component or combination of components such as a compute server, a storage server, a network server, a cloud server, and/or the like, a node such as a storage node, a computer such as a workstation, a personal computer, a tablet, a smartphone, and/or the like, or multiples and/or combinations thereof.

Any of the communication connections and/or communication interfaces disclosed herein may be implemented with one or more interconnects, one or more networks, a network of networks (e.g., the internet), and/or the like, or a combination thereof, using any type of interface and/or protocol. Examples may include Peripheral Component Interconnect Express (PCIe), NVMe, NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROCE), FibreChannel, InfiniBand, Serial ATA (SATA), Small Computer Systems Interface (SCSI), Serial Attached SCSI (SAS), iWARP, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), and/or the like, Advanced eXtensible Interface (AXI), any generation of wireless network including 2G, 3G, 4G, 5G, 6G, and/or the like, any generation of Wi-Fi, Bluetooth, near-field communication (NFC), and/or the like, or any combination thereof.

Any of the functionality described herein, including any of the host functionality, storage device functionally, and/or the like (e.g., any of the storage device controllers, logic, and/or the like) may be implemented with hardware, software, firmware, or any combination thereof including, for example, hardware and/or software combinational logic, sequential logic, timers, counters, registers, state machines, volatile memories such DRAM and/or SRAM, nonvolatile memory including flash memory, persistent memory such as cross-gridded nonvolatile memory, memory with bulk resistance change, PCM, and/or the like and/or any combination thereof, complex programmable logic devices (CPLDs), field programmable gate arrays (FPGAs), application specific circuits (ASICs), central processing units (CPUs) including CISC processors such as x86 processors and/or RISC processors such as ARM processors, graphics processing units (GRUs), neural processing units (NPUs), tensor processing units (TPUs), and/or the like, executing instructions stored in any type of memory. In some embodiments, one or more components may be implemented as a system-on-chip (SOC).

In embodiments implemented at least partially with a storage device having a flash translation layer (FTL) any of the functionality described herein (e.g., any of the storage device controllers, logic, and/or the like) may be implemented at least partially with an FTL.

Figure 15:
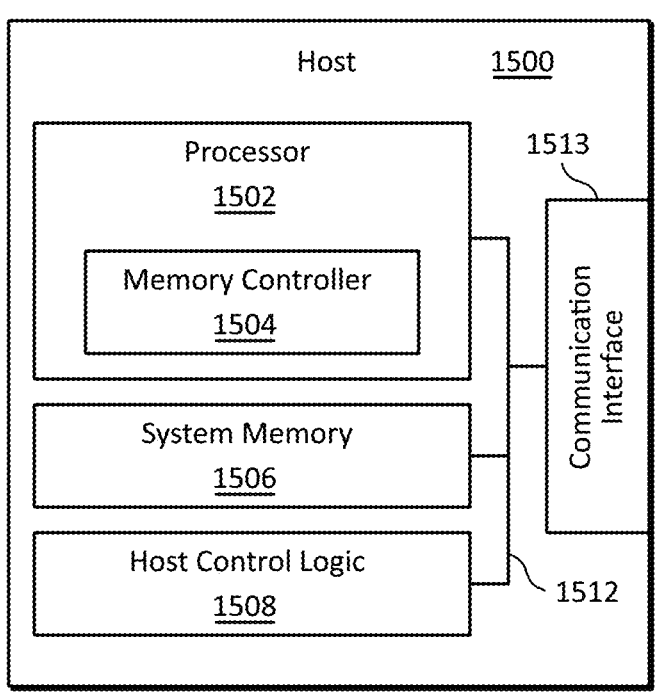
FIG. 15 illustrates an example embodiment of a host apparatus in accordance with example embodiments of the disclosure.

FIG. 15 illustrates an example embodiment of a host apparatus that may be used to implement any of the host functionality disclosed herein in accordance with example embodiments of the disclosure. The host apparatus 1500 illustrated in FIG. 15 may include a processor 1502, which may include a memory controller 1504, a system memory 1506, host control logic 1508, and/or a communication interface 1510. Any or all of the components illustrated in FIG. 15 may communicate through one or more system buses 1512. In some embodiments, one or more of the components illustrated in FIG. 15 may be implemented using other components. For example, in some embodiments, the host control logic 1508 may be implemented by the processor 1502 executing instructions stored in the system memory 1506 or other memory.

Figure 16:
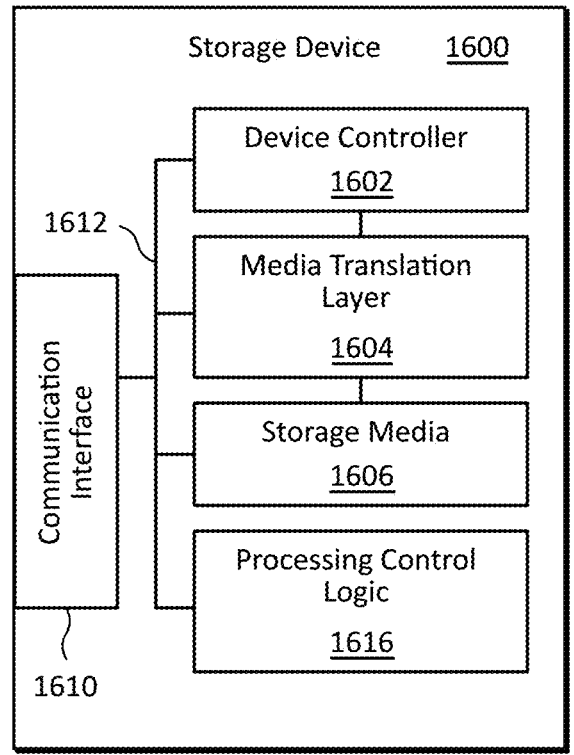
FIG. 16 illustrates an example embodiment of a storage device in accordance with example embodiments of the disclosure.

FIG. 16 illustrates an example embodiment of a storage device that may be used to implement any of the storage device functionality disclosed herein in accordance with example embodiments of the disclosure. The storage device 1600 may include a device controller 1602, a media translation layer 1604 (e.g., an FTL), a storage media 1606, feature logic 1616 (which may be used, for example, to implement any of the logic disclosed in FIG. 7 and/or FIG. 8), and a communication interface 1610. The components illustrated in FIG. 16 may communicate through one or more device buses 1612. In some embodiments that may use flash memory for some or all of the storage media 1606, the media translation layer 1604 may be implemented partially or entirely as a flash translation layer (FTL).

FIG. 17 illustrates an embodiment of a method for flexible data placement for a storage device in accordance with example embodiments of the disclosure. The method may begin at operation 1702. At operation 1704, the method may receive, at a storage device, a write command, wherein the storage device may include at least one storage medium, and the write command may indicate a reclaim unit handle of the at least one storage medium. For example, the reclaim unit handle may be indicated by a reclaim unit handle identifier (e.g., a reclaim unit handle 436 may be indicated by reclaim unit handle identifier 440 illustrated in FIG. 4) which may be indicated by a placement handle (e.g., placement handle 416 illustrated in FIG. 4) which, in turn, may be included in a placement identifier which may be included with the write command (e.g., placement handle 416 may be indicated by placement identifier 434 included with write command 430).

At operation 1706, the method may perform, based on the reclaim unit handle, and based on an operation or condition of the storage device, a selection of a reclaim unit of the at least one storage medium. For example, the reclaim unit (e.g., a reclaim unit 414 illustrated in FIG. 4) may be selected based on the reclaim unit handle (e.g., a reclaim unit handle 436 illustrated in FIG. 4), and based on an operation of the storage device such as a write, read, or erase operation, a command queue status, a programming status, a write buffer status, and/or the like (e.g., as implemented by logic 754 illustrated in FIG. 7), or based on a condition of the storage device such as a wear condition of a reclaim unit, an open block timer, and/or the like (e.g., as implemented by logic 764 illustrated in FIG. 7).

At operation 1708, the method may store, based on the write command, data to the reclaim unit (e.g., a reclaim unit selected by reclaim unit selection logic 752 illustrated in FIG. 7). The method may end at operation 1710.

The embodiment illustrated in FIG. 17, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. A reference to a component or element may refer to one or more of the component or element, and a reference to plural components or elements may refer to a single component or element. For example, a reference to a resource may refer to one more resources, and a reference to resources may refer to a single resource. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner. The various details and embodiments described above may be combined to produce additional embodiments according to the inventive principles of this patent disclosure.

Since the inventive principles of this patent disclosure may be modified in arrangement and detail without departing from the inventive concepts, such changes and modifications are considered to fall within the scope of the following claims.

The invention claimed is:

1. An apparatus comprising:
a storage device comprising:
at least one storage medium and a controller configured to control the at least one storage medium;
wherein the controller is configured to:
receive a write command, wherein the write command includes a namespace identifier (ID) and indicates a reclaim unit handle, wherein at least a portion of data on the storage device is managed based on namespace IDs and logical block addresses (LBAs);
translate the namespace ID and the reclaim unit handle to a set of reclaim unit handles of the storage device, the set of reclaim unit handles including at least a first reclaim unit handle indicating a first reclaim unit of the storage device and a second reclaim unit handle indicating a second reclaim unit of the storage device;
perform a selection of the second reclaim unit based on translation of the reclaim unit handle of the write command and a conflict between the first reclaim unit and the write command; and
store data to the second reclaim unit based on the selection of the second reclaim unit.

2. The apparatus of claim 1, wherein:
the at least one storage medium comprises a first reclaim group including the first reclaim unit and a second reclaim group including the second reclaim unit; and
the selection of the second reclaim unit comprises performing a selection of the second reclaim group.

3. The apparatus of claim 2, wherein:
the selection of the second reclaim unit is based on a namespace; and
the namespace comprises the first reclaim unit and the second reclaim unit.

4. The apparatus of claim 2, wherein:
the controller is configured to receive a placement identifier with the write command;
the placement identifier comprises a placement handle; and
the selection of the second reclaim unit is based on the placement handle.

5. The apparatus of claim 4, wherein the placement handle corresponds to the second reclaim unit handle.

6. The apparatus of claim 1, wherein the conflict between the first reclaim unit and the write command is based on an operation of the storage device that comprises at least one of a programming operation of the at least one storage medium, a read operation of the at least one storage medium, or an erase operation of the at least one storage medium.

7. The apparatus of claim 1, wherein the conflict between the first reclaim unit and the write command is based on an operation of the storage device that comprises a command queuing operation for the at least one storage medium.

8. The apparatus of claim 1, wherein the conflict between the first reclaim unit and the write command is based on an operation of the storage device that comprises a completion status of a programming operation of the at least one storage medium.

9. The apparatus of claim 1, wherein the conflict between the first reclaim unit and the write command is based on an operation of the storage device that comprises a write buffering operation for the at least one storage medium.

10. The apparatus of claim 1, wherein the conflict between the first reclaim unit and the write command is based on an operation of the storage device that comprises an open block operation.

11. The apparatus of claim 1, wherein the conflict between the first reclaim unit and the write command is based on a condition of the storage device that comprises a wear state of at least a portion of the at least one storage medium.

12. The apparatus of claim 1, wherein the controller is configured to determine the conflict between the first reclaim unit and the write command based on a behavior of at least a portion of the at least one storage medium.

13. The apparatus of claim 1, wherein the controller is configured to:
receive an indication from a host; and
perform the selection of the reclaim unit based on the indication.

14. The apparatus of claim 13, wherein the indication comprises at least one of bandwidth information for the data or quality of service information for the data.

15. The apparatus of claim 13, wherein the indication comprises access information for the data.

16. The apparatus of claim 13, wherein the indication comprises allocation information for the data.

17. An apparatus comprising:

at least one processor configured to:

select a reclaim unit of at least one storage medium of a storage device, the reclaim unit selected to store data;

send, to a controller of the storage device, a write command that includes a namespace identifier (ID) and indicates a reclaim unit handle for the reclaim unit of the at least one storage medium, wherein the reclaim unit handle maps, based on the namespace ID, to a set of reclaim unit handles that are selectable by the storage device, the set of reclaim unit handles including at least a first reclaim unit handle indicating a first reclaim unit of a first reclaim group of the storage device and a second reclaim unit handle indicating a second reclaim unit of a second reclaim group of the storage device, and wherein at least a portion of data on the storage device is managed based on namespace IDs and logical block addresses (LBAs); and send an indication about the data to store based on the write command, the data being stored at the second reclaim unit based on a conflict between the first reclaim unit and the write command.

18. The apparatus of claim 17, wherein the indication comprises one or more of bandwidth information for the data, quality of service information for the data, access information about the data, or allocation information about the data.

19. A storage device comprising:

at least one storage medium; and a controller configured to:

control the at least one storage medium;

receive a data operation request, wherein the data operation request includes a namespace identifier (ID) and indicates a reclaim unit handle, wherein at least a portion of data on the storage device is managed based on namespace IDs and logical block addresses (LBAs);

translate the namespace ID and the reclaim unit handle of the data operation request to a set of reclaim unit handles of the storage device, the set of reclaim unit handles including at least a first reclaim unit handle indicating a first reclaim unit of the storage device and a second reclaim unit handle indicating a second reclaim unit of the storage device; and perform, based on the data operation request, a data operation associated with the second reclaim unit, wherein the data operation is based on a selection of the second reclaim unit based on a conflict between the first reclaim unit and the data operation request.

20. The storage device of claim 19, wherein:

the data operation comprises at least one of a write operation, a read operation, a copy operation, a deallocate operation, a sanitize operation, an erase operation, a format operation, or a compare and write operation, and the LBAs are different from the namespace IDs.

* * * * *